(12) United States Patent
Tiwari et al.

(10) Patent No.: US 10,846,657 B2
(45) Date of Patent: Nov. 24, 2020

(54) METHOD FOR TRACKING STOCK LEVEL WITHIN A STORE

(71) Applicant: Simbe Robotics, Inc., San Francisco, CA (US)

(72) Inventors: Durgesh Tiwari, San Francisco, CA (US); Bradley Bogolea, San Francisco, CA (US); Mirza Akbar Shah, San Francisco, CA (US); Jeffrey Gee, San Francisco, CA (US)

(73) Assignee: Simbe Robotics, Inc., San Francisco, CA (US)

( * ) Notice: Subject to any disclaimer, the term of this patent is extended or adjusted under 35 U.S.C. 154(b) by 302 days.

(21) Appl. No.: 15/947,757

(22) Filed: Apr. 6, 2018

(65) Prior Publication Data

US 2018/0293543 A1 Oct. 11, 2018

Related U.S. Application Data

(60) Provisional application No. 62/482,907, filed on Apr. 7, 2017.

(51) Int. Cl.
| | |
|---|---|
| *G06Q 10/08* | (2012.01) |
| *H04W 4/35* | (2018.01) |
| *G05D 1/02* | (2020.01) |
| *H04W 4/80* | (2018.01) |
| *B25J 9/16* | (2006.01) |
| *H04W 4/02* | (2018.01) |

(52) U.S. Cl.
CPC ........ *G06Q 10/0875* (2013.01); *B25J 9/1697* (2013.01); *G05D 1/0274* (2013.01); *H04W 4/023* (2013.01); *H04W 4/35* (2018.02); *H04W 4/80* (2018.02); *G05D 2201/0216* (2013.01)

(58) Field of Classification Search
CPC ........ G06Q 10/00; G06Q 10/08; G06Q 30/06; G06Q 90/00; G06Q 30/02; G06Q 10/04; G06Q 10/06; G06K 9/00
USPC ............ 340/10.1, 572.1, 5.92; 382/100, 209, 382/218, 103; 705/28
See application file for complete search history.

(56) References Cited

U.S. PATENT DOCUMENTS

| | | | | |
|---|---|---|---|---|
| 7,949,568 B2 * | 5/2011 | Fano | ........................ | G06K 9/00 356/4.03 |
| 8,009,864 B2 * | 8/2011 | Linaker | .............. | G06K 9/00664 235/385 |

(Continued)

*Primary Examiner* — Olusegun Goyea
(74) *Attorney, Agent, or Firm* — Run8 Patent Group, LLC; Peter Miller

(57) ABSTRACT

One variation of a method for tracking stock level within a store includes: at a robotic system, navigating along a first inventory structure in the store, broadcasting radio frequency interrogation signals according to a first set of wireless scan parameters, and recording a first set of wireless identification signals returned by radio frequency identification tags coupled to product units arranged on the first inventory structure; generating a first list of product units arranged on the first inventory structure based on the first set of wireless identification signals; detecting a first product quantity difference between the first list of product units and a first target stock list assigned to the first inventory structure by a planogram of the store; and generating a stock correction prompt for the first inventory structure in response to the first product quantity difference.

19 Claims, 6 Drawing Sheets

(56) References Cited

U.S. PATENT DOCUMENTS

| | | | | |
|---|---|---|---|---|
| 8,049,621 B1* | 11/2011 | Egan | ............... | G06Q 10/087 |
| | | | | 235/375 |
| 8,189,855 B2* | 5/2012 | Opalach | ............ | G06Q 10/087 |
| | | | | 382/100 |
| 8,630,924 B2* | 1/2014 | Groenevelt | ........ | G06Q 10/087 |
| | | | | 211/90.01 |
| 10,339,579 B2* | 7/2019 | Bonner | ............ | G06Q 10/087 |
| 2003/0216969 A1* | 11/2003 | Bauer | ................ | H01Q 7/00 |
| | | | | 705/22 |
| 2008/0077511 A1* | 3/2008 | Zimmerman | ........ | G06Q 10/00 |
| | | | | 705/28 |
| 2009/0063307 A1* | 3/2009 | Groenovelt | ........ | G06Q 10/087 |
| | | | | 705/28 |
| 2009/0094140 A1* | 4/2009 | Kwan | .............. | G06Q 10/087 |
| | | | | 705/28 |
| 2010/0201488 A1* | 8/2010 | Stern | ................ | G06K 7/0008 |
| | | | | 340/10.1 |
| 2011/0163160 A1* | 7/2011 | Zini | ................ | G05D 1/0238 |
| | | | | 235/385 |
| 2013/0300729 A1* | 11/2013 | Grimaud | ............ | G06T 7/001 |
| | | | | 345/419 |
| 2014/0144986 A1* | 5/2014 | Forster | ............ | G06Q 10/087 |
| | | | | 235/385 |
| 2017/0177172 A1* | 6/2017 | Graham | ........... | G06Q 30/0643 |
| 2017/0177195 A1* | 6/2017 | Findlay | ................ | G06K 9/22 |
| 2017/0178060 A1* | 6/2017 | Schwartz | ........... | G06K 9/6267 |
| 2017/0185951 A1* | 6/2017 | Kawashima | ....... | G06Q 10/087 |
| 2017/0286773 A1* | 10/2017 | Skaff | ............... | G06K 9/6267 |
| 2018/0060804 A1* | 3/2018 | Cheruku | ........... | G06K 9/4661 |
| 2018/0247264 A1* | 8/2018 | Taylor | ............... | G06Q 10/047 |

* cited by examiner

METHOD FOR TRACKING STOCK LEVEL WITHIN A STORE

CROSS-REFERENCE TO RELATED APPLICATIONS

This Application claims the benefit of U.S. Provisional Application No. 62/482,907, filed on 7 Apr. 2017, which is incorporated in its entirety by this reference.

The application is related to U.S. patent application Ser. No. 15/347,689, filed on 9 Nov. 2016, and U.S. patent application Ser. No. 15/600,527, filed on 19 May 2017, both of which are incorporated in their entireties by this reference

TECHNICAL FIELD

This invention relates generally to the field of stock tracking and more specifically to a new and useful method for tracking stock level within a store in the field of stock tracking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
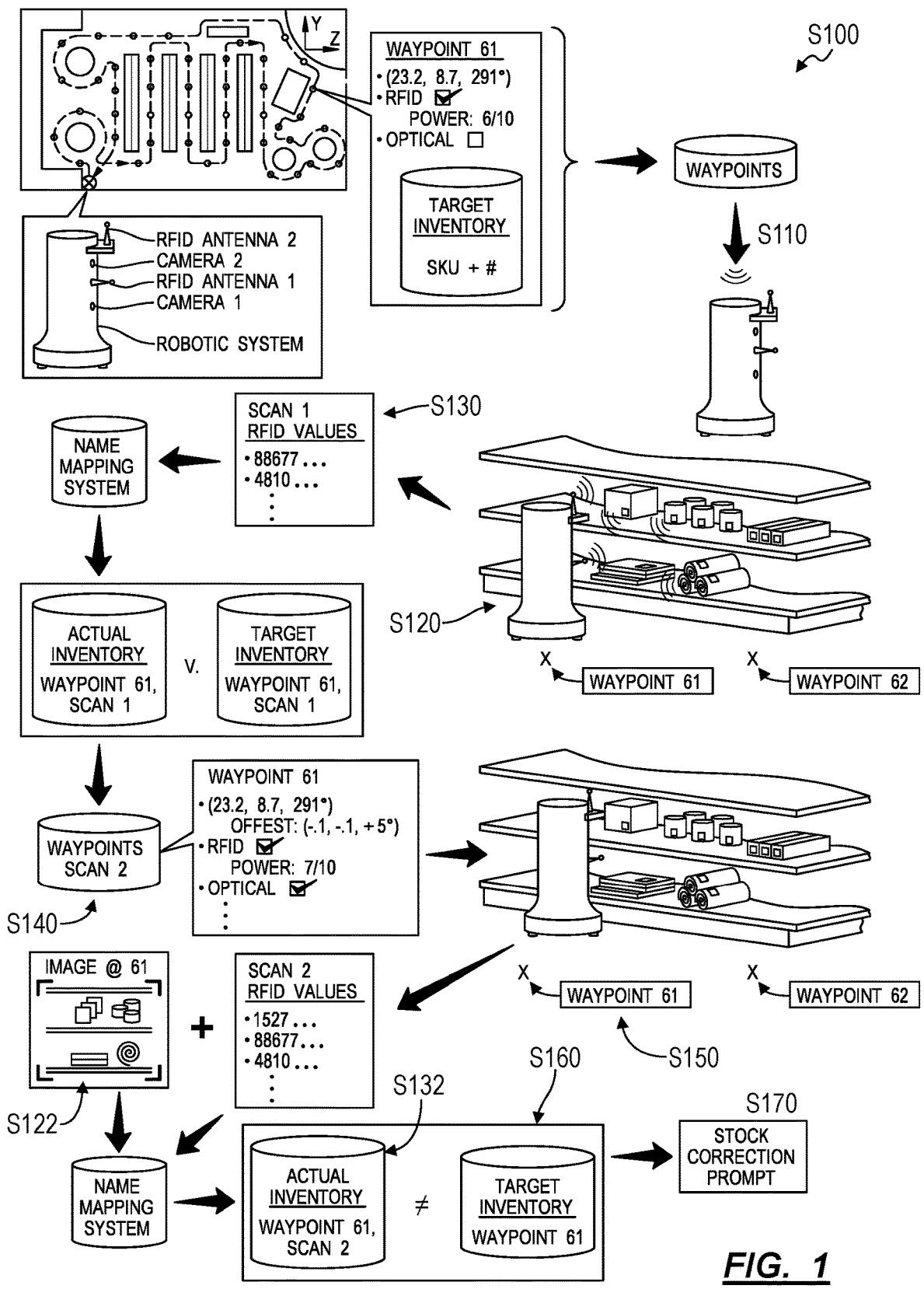
FIG. 1 is a flowchart representation of a method.
Figure 2:
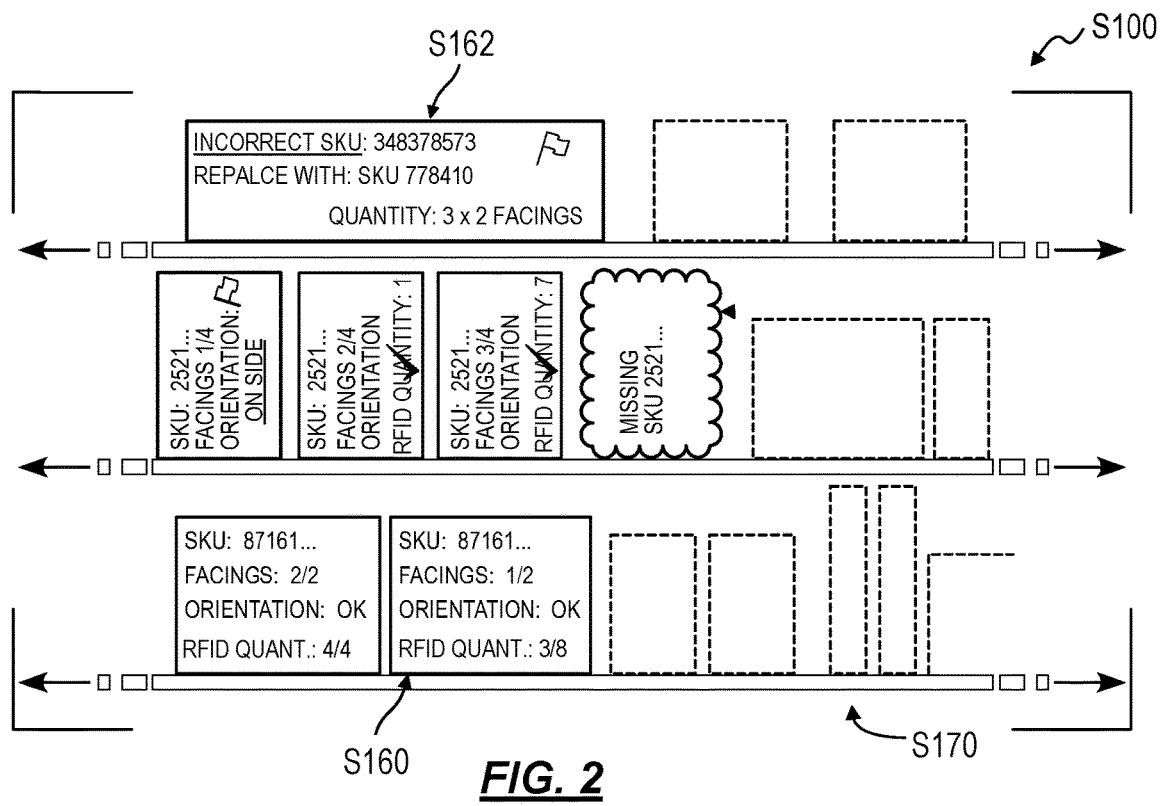
FIG. 2 is a graphical representation of one variation of the method.

As shown in FIGS. 1 and 2, a method for tracking stock level within a store includes: dispatching a robotic system to execute scan routines at a set of waypoints proximal inventory structures throughout the store in Block S110; over a first period of time at a robotic system, navigating along a first inventory structure in the store, broadcasting radio frequency interrogation signals according to a first set of wireless scan parameters, and recording a first set of wireless identification signals returned by radio frequency identification tags coupled to product units arranged on the first inventory structure in Block S120; generating a first list of product units arranged on the first inventory structure based on the first set of wireless identification signals in Block S130; in response to a difference between the list of product units and a first target stock list assigned to the first inventory structure by a planogram of the store, defining a second set of wireless scan parameters differing from the first set of wireless scan parameters in Block S140; over a second period of time succeeding the first period of time at the robotic system, navigating along the first inventory structure, broadcasting radio frequency interrogation signals according to the second set of wireless scan parameters, and recording a second set of wireless identification signals returned by radio frequency identification tags coupled to product units arranged on the first inventory structure in Block S150; generating a second list of product units arranged on the first inventory structure based on the second set of wireless identification signals in Block S132; and generating a digital report of products stocked on the first inventory structure based on a combination of the first list of product units and the second list of product units in Block S170.

One variation of the method includes: at a robotic system, over a first period of time, navigating along a first inventory structure in the store, broadcasting radio frequency interrogation signals according to a first set of wireless scan parameters, and recording a first set of wireless identification signals returned by radio frequency identification tags coupled to product units arranged on the first inventory structure in Block S120; generating a first list of product units arranged on the first inventory structure based on the first set of wireless identification signals in Block S130; detecting a first product quantity difference between the first list of product units and a first target stock list assigned to the first inventory structure by a planogram of the store in Block S160; and generating a stock correction prompt for the first inventory structure in response to the first product quantity difference in Block S170.

Yet another variation of the method includes: at a robotic system, over a first period of time, navigating along a first inventory structure in the store, broadcasting radio frequency interrogation signals according to a first set of wireless scan parameters, recording a first set of wireless identification signals returned by radio frequency identification tags coupled to product units arranged on the first inventory structure in Block S120, and recording a set of optical images of the first inventory structure in Block S122; generating a first list of product units arranged on the first inventory structure based on the first set of wireless identification signals in Block S130; identifying a second set of product units arranged on the first inventory structure in the set of optical images in Block S122; detecting a first product quantity difference between the first list of product units and a first target stock list assigned to the first inventory structure by a planogram of the store in Block S160; detecting a first product location difference between locations of product units, in the second set of product units identified in the set of optical images, and product locations assigned to the first inventory structure by the planogram; and in response to the first product quantity difference and the first product location difference, generating a stock correction prompt for the first inventory structure in Block S110.

2. Applications

Generally, Blocks of the method can be executed by a system (e.g., a robotic system and/or a local or remote computer system): to dispatch a robotic system to capture images of products arranged on shelves throughout a retail space (e.g., a sporting goods store, a clothing store, a home improvement store, a grocery store, etc.); to determine the stocking status of products assigned to inventory structures (e.g., slots on shelves, hanging racks, cubbies, etc.) throughout the retail space based on radio frequency identification (hereinafter "RFID") data collected from RFID tags arranged on or integrated into products stocked throughout the retail space and based on a planogram defining product quantities and locations throughout the retail space; and to automatically generate a stocking report for the retail space. In particular, the system can execute Blocks of the method to automatically: execute scan routines—to collect RFID data from products stocked on inventory structures—at defined waypoints throughout the retail space according to initial scan parameters; to transform these RFID data into product identifiers (e.g., stock-keeping units, or "SKUs"); to compare these product identifiers to product stocking specifications assigned to inventory structures in the store by a planogram; and to adjust these scan parameters and selectively repeat scan routines at certain waypoints according to these adjusted scan parameters if product identifiers collected during previous scan routines at these waypoints do not sufficiently align to product stocking specifications defined by a planogram in order to collect RFID values (or "wireless identification signals") from RFID tags that may have been obscured during previous scan routines, thereby improving accuracy and completeness of a list of RFID values collected by the robotic system during a scan cycle though the retail space.

Therefore, Blocks of the method can be executed by a single, low-cost mobile RFID inventorying infrastructure (e.g., the "robotic system") to collect item-level RFID inventory data from product distributed throughout a retail space, thereby reducing or eliminating need for installation of fixed power and network connection within a retail space for fixed RFID inventorying infrastructure and reducing or eliminating need to replace or modify existing fixed RFID inventorying infrastructure when layout or format of the retail space is changed. Rather, the robotic system can execute Blocks of the method to traverse the retail space and to implement functionality of fixed RFID infrastructure in n-number of discrete locations (i.e., "waypoints") throughout the retail space. Furthermore, the robotic system can implement closed-loop controls to adjust scan parameters implemented at waypoints throughout the store based on differences between actual products detected near these waypoints (e.g., as informed by RFID collected at these waypoints) and products expected to be stocked near these waypoints (i.e., as defined in a planogram of the retail space) in order to achieve a high degree of completeness in RFID data collected from RFID tags on products stocked throughout the retail space. Therefore, the robotic system can execute Blocks of the method to mimic manual RFID scans of inventory structure throughout the retail space but with added closed-loop controls that yield improved accuracy of collected RFID data, as well as known location and pose of the robotic system when RFID data is collected, which the robotic system (or the computer system) can then merge with RFID data to reconstruct a 2D or 3D map of RFID tag locations throughout store.

While executing RFID-based scans of the retail space, the robotic system can also collect digital photographic images (hereinafter "images") of inventory structure within the retail space and process these images to determine presence and arrangement of units of products on these inventory structure, as described in U.S. patent application Ser. No. 15/347,689, filed on 9 Nov. 2016, which is incorporated in its entirety by this reference. The robotic system (or the computer system) can then implement closed-loop controls to adjust RFID scan parameters until all products identified in images on adjacent inventory structures are also detected in RFID scans along the inventory structure. The robotic system can also merge images and/or image-based inventory data with RFID data collected throughout the retail space to construct a comprehensive digital report of the stock state of the retail space, such as including: product orientation and facing data from digital photographic images; quantities of products otherwise visually obstructed from the robotic system (e.g., by other products on a shelf) based on RFID data; and quantities of other products visually accessible to the robotic system but contain or are packaged in materials (e.g., metal, liquid) that obscure radio frequency signals between these products and the robotic system based on these digital photographic images.

Therefore, the system can: include a robotic system that collects RFID data and/or digital photographic images of inventory structure throughout a store; transform these RFID data and images into current stock states of inventory structure throughout the store, such as substantially in real-time; and generate a digital report of the inventory state of the store. In particular, sales data collected through a point-of-sale (or "POS") system in the store may not account for theft of product, damaged product, lost product, misplaced product on shelves, improper product facing orientation on shelves, or origin of unit of product sold. (For example, a carbonated beverage may be stocked in 25 unique locations within a store, but sale of a unit of carbonated beverage at the POS may not indicate from which of these 25 unique locations the unit of carbonated beverage originated.) However, by dispatching the robotic system to collect images of shelves throughout the store, the system can: access real-time, on-floor inventory including quantities of products via RFID data and/or product orientation and facings via optical data; detect "holes," misplaced product, and low-stock slots throughout the store accordingly; and then serve directed prompts to restock inventory structures in the store, such as in real-time or during scheduled restocking periods. The system can therefore implement the method to: eliminate a need for associates to take manual inventory of the store, such as by waving an RFID wand over inventory structures; and automatically generate a global inventory state and/or a global restocking list for the store; while also eliminating the need for fixed RFID scanning inventory systems; and accommodate format and layout changes of inventory structure in the store without necessitating changes to power or network infrastructure within the store.

(The system can similarly execute Blocks of the method S100 to implement perpetual inventory techniques to account for changing inventory in the store by recording (near) real-time changes in product stock on shelves throughout the store, such as to account for product units that are lost, damaged, stolen, misplaced, or not shelved.)

3. Robotic System

During a scan cycle, a robotic system navigates to waypoints—handled by the system according to Blocks of the method described below—and executes a scan routine to capture RFID data and/or images of inventory structures in the store at each of these waypoints. Generally, the robotic system can define a network-enabled mobile robot that can autonomously traverse a store, capture radio frequency identification and/or optical data, and upload those RFID and optical data to a computer system for analysis according to methods and techniques described below, as shown in FIG. 3.

Alternatively, the robotic system can analyze these RFID and optical data locally. Furthermore, the computer system is described herein as defining waypoints—including RFID interrogation parameters, imaging parameters, and robotic system orientations—throughout the store, and the robotic system is described herein as sequentially navigating to these waypoints and executing RFID interrogation parameters and imaging parameters defined by these waypoints. However, the computer system can alternatively define a continuous scan path along a shelving segment, a shelving structure, an aisle, a set of inventory structures, or throughout the entire store with fixed or varying (e.g., parametric or non-parametric) RFID interrogation and imaging parameters; and the robotic system can navigate along this continuous scan path while broadcasting an RFID interrogation signal, recording RFID values returned by RFID tags nearby, and/or recording optical (e.g., digital photographic) images substantially continuously along this path.

Figure 3:
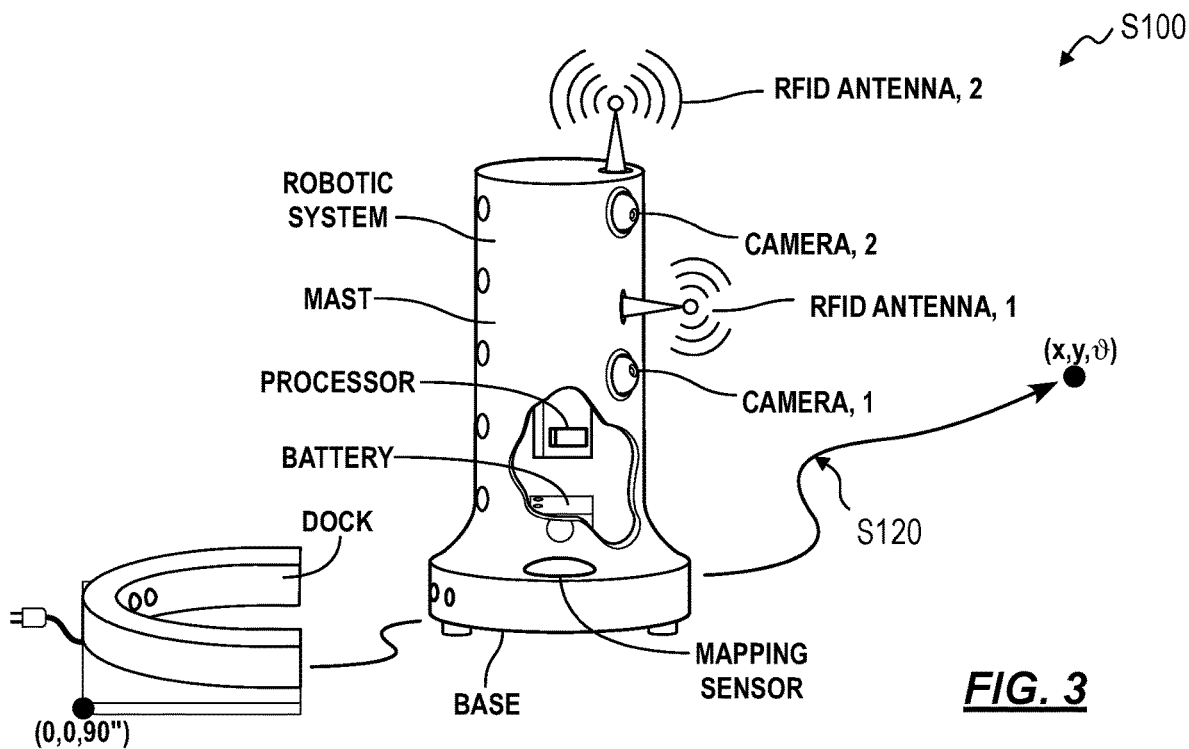
FIG. 3 is a flowchart representation of one variation of the method.

In one implementation shown in FIG. 3, the robotic system defines an autonomous vehicle including: a base; a drive system (e.g., a pair of two driven wheels and four swiveling castors) arranged in the base; a power supply (e.g., an electric battery); a set of mapping sensors (e.g., fore and aft LIDAR scanning systems); a processor that transforms data collected by the mapping sensors into two- or 3D maps of a space around the robotic system; a mast extending vertically from the base; a set of cameras arranged on the mast (e.g., a set of seven color cameras arranged on the right side of the mast, each outfitting with zoom and autofocus capabilities); a geospatial position sensor (e.g., a GPS sensor); and/or a wireless communication module that downloads waypoints and a master map of a store from a computer system (e.g., a remote server) and that uploads RFID data and/or digital photographic images captured by the camera and maps generated by the processor to the computer system.

The robotic system also includes an RFID antenna and an RFID reader that cooperate to: broadcast an interrogation signal; and to collect and discern inbound RF signals broadcast from RFID tags excited by the interrogation signal. In one variation, the robotic system includes multiple RFID antennas. For example, the robotic system can include a first RFID antenna arranged in a first polarization orientation at a first position along the mast; and a second RFID antenna arranged in a second polarization orientation at a second position along the mast. In this example, the second polarization orientation can be angularly offset from the first polarization orientation by a known angle (e.g., 90°) about a horizontal axis of the robotic system; and the second position can be vertically offset above the first position by a known distance (e.g., 50 centimeters). During a scan routine, the robotic system can: trigger both the first and second RFID antennas to broadcast interrogation signals; collect RF signals through both the first and second RFID antennas; and compile these RF signals and related metadata into a 2D or 3D map of locations of RFID tags—from which these RF signals originated—based on known linear offsets between the first and second antennas. Furthermore, a particular RFID tag parallel to the plane of propagation of an interrogation signal broadcast by the first antenna may not return an RF signal to the robotic system; however, because the second antenna is angularly offset from the first antenna, the particular RFID tag may be necessarily non-parallel to the plane of propagation of an interrogation signal broadcast by the second antenna. Therefore, the robotic system can include two (or more) non-parallel RFID antennas in order to enable collection of RF signals from a greater proportion of nearby RFID tags, including RFID tags that may be obscured from one RFID antenna in the set.

The robotic system can also include cameras mounted statically to the mast, such as two vertically offset cameras on a left side of the mast and two vertically offset cameras on the right side of the mast, as shown in FIG. 3. The robotic system can additionally or alternatively include articulable cameras, such as: one camera on the left side of the mast and supported by a first vertical scanning actuator; and one camera on the right side of the mast and supported by a second vertical scanning actuator. Furthermore, each camera can include a zoom lens or a wide-angle lens, etc.

However, the robotic system can define any other form and can include any other subsystems or elements supporting autonomous navigation and image capture throughout a store environment.

4. Hierarchy and Terms

A "product facing" is referred to herein as a side of a product (e.g., of a particular SKU or other product identifier) designated for a slot on an inventory structure described below. A "planogram" is referred to herein as a graphical representation, diagram, or model that indicates target placement of retail products on a shelving structure within a store. For example, a planogram of a store can be defined by a store manager or corporate representative, stored in a database, and accessed by the computer system to execute Blocks of the method S100. Alternatively, for a store in which a predefined planogram is not available, the computer system can cooperate with the robotic system to collect RFID data (e.g., UPC values, EPC values) from RFID tags arranged on retail products on shelves within the store, as described below, and the computer system can (re)construct a planogram of shelves throughout the store based on these RFID data and product data linked to these RFID data; the system can then implement this "constructed" planogram to detect changes in stock level throughout the store over time.

A "realogram" is referred to herein as a collection of multiple planograms representing multiple shelving structures within a store (e.g., across an entire store). Product identification, placement, and orientation data recorded visually in a planogram (or multiple planograms) can also be recorded in a corresponding textual product placement spreadsheet, slot index, or other store database (hereinafter a "product placement database").

A "slot" is referred to herein as a section of a shelf designated for occupation by one product facing, including a row of one or more units of a product. A "shelf" is referenced herein as one lateral surface (e.g., one four-foot-wide horizontal surface) spanning one or more slots. A "shelving segment" is referred to herein as one column of a shelving structure, including one or more shelves. A "shelving structure" is referred to herein as a row of one or more shelving segments. An "aisle" is referred to herein as a thoroughfare between two opposing shelving structures. A "store" is referred to herein as a (static or mobile) facility containing one or more shelving structures and one or more aisles. Furthermore, an "inventory structure" is referred to herein as a structure arranged within the store and configured to store one or more units of one or more products, such as: a shelving structure; a shelving unit; a set of (e.g., one or more) slots; a wall rack; a freestanding rack (e.g., hanging clothing rack); a set of cubbies; a floor refrigeration unit; or a table; etc.

A "product" is referred to herein as a type of good associated with a particular product identifier (e.g., a "SKU," an "EPC," or a "UPC"). A "unit" or "product unit" is referred to herein as an instance of a product, such as one packaged article associated with one SKU value. An "address" is referred to herein as a pointer to a corresponding aisle, shelving structure, shelving segment, shelf, slot and/or other data stored in a planogram (or in a product position database, etc.) for the store.

Various Blocks of the method are described herein as executed by a computer system (e.g., a remote server), while other Blocks of the method are described herein as executed by a robotic system provisioned to a store. However, various combinations of Blocks of the method can be executed locally by one or more robotic systems placed in a store (or a retail space, a warehouse, etc.), by a local computer system, or by any other local or computer system or device.

5. Robotic System Dispatch

Figure 4:
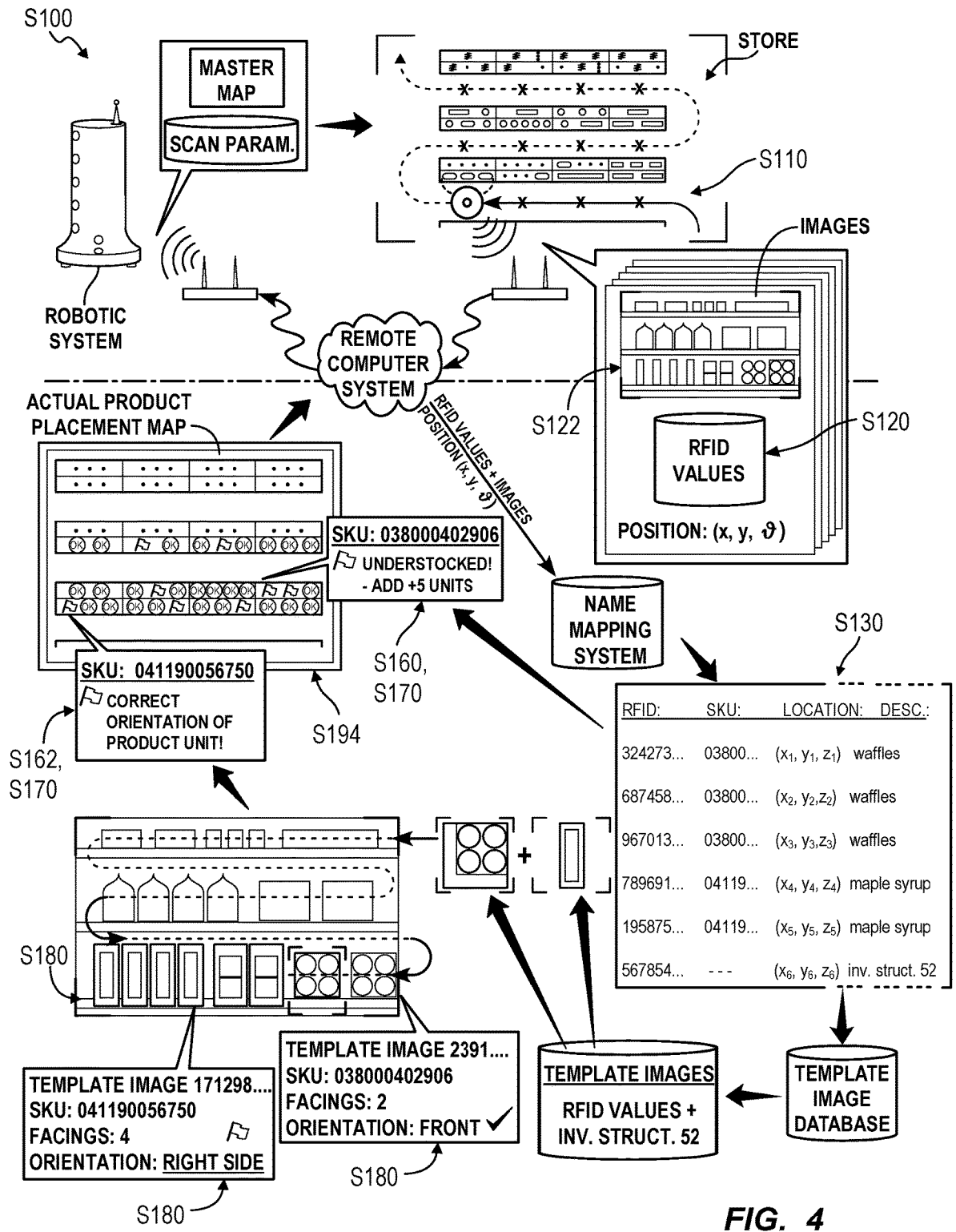
FIG. 4 is a flowchart representation of one variation of the method

Block S110 of the method recites dispatching a robotic system to execute scan routines at a set of waypoints proximal (or continuously along) inventory structures throughout the store. Generally, in Block S110, a set of waypoints—each defining a location and orientation of the robotic system, initial RFID scan parameters, and/or initial optical scan parameters, etc.—can be generated by the computer system and then loaded onto the robotic system for execution in Block S120, such as shown in FIG. 4.

As described in U.S. patent application Ser. No. 15/347,689, the computer system can define a set of waypoints and an order of these waypoints throughout a store. For example, the computer system can generate a set of waypoints that each define a position (e.g., an (x, y) location) of the robotic system and an orientation of the robotic system relative to a coordinate system assigned to the store.

5.1 Auto-Configuration from Planogram

Figure 5:
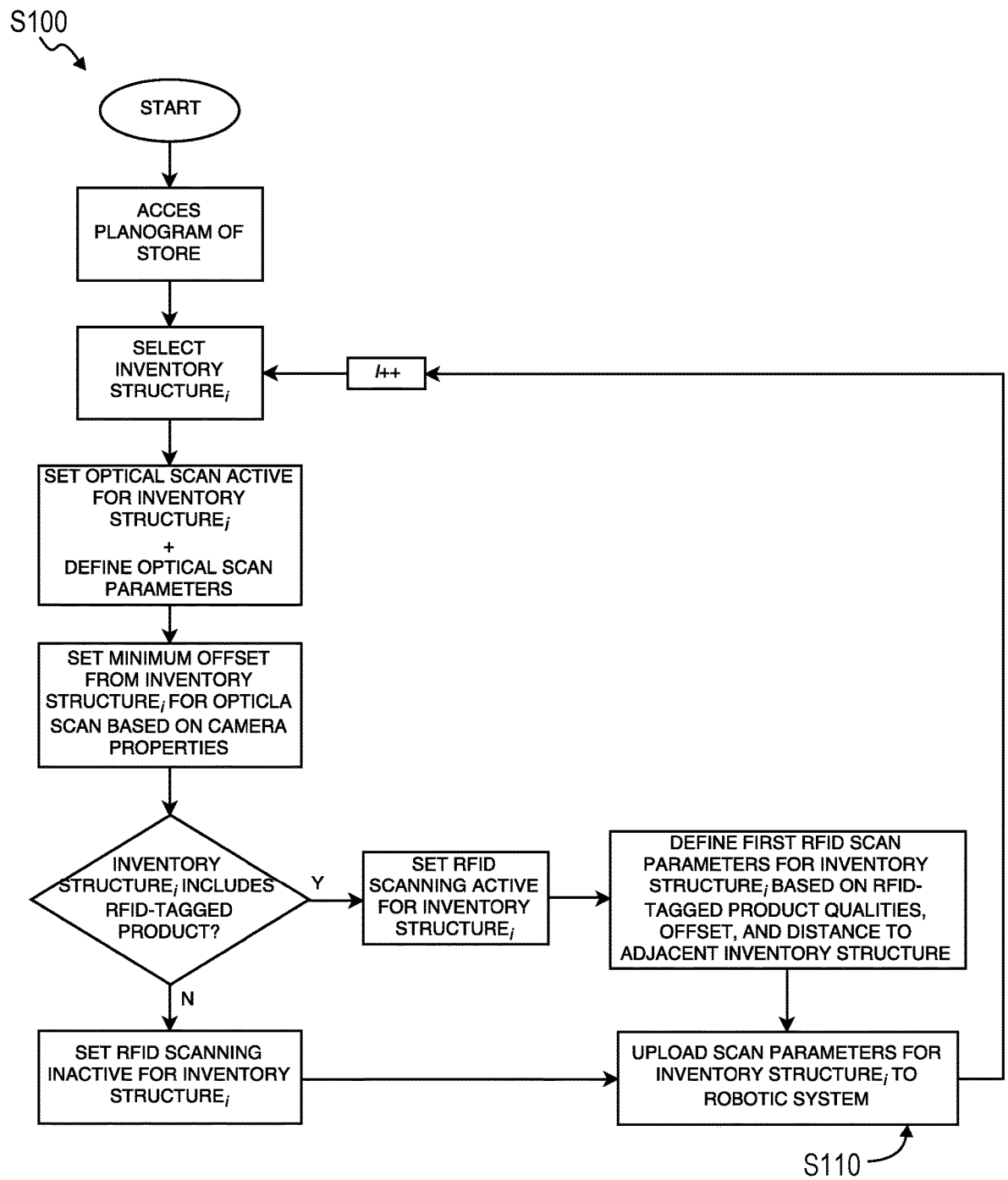
FIG. 5 is a flowchart representation of one variation of the method

As in the examples described below, the computer system can leverage an existing planogram of the store: to selectively designate an inventory structure for RFID scanning and/or optical scanning; to set a speed, an RFID interrogation power, and a distance from the inventory structure at which the robotic system may interrogate RFID tags on product units on this inventory structure during a scan cycle (or "cycle count"); and/or to specify positions and orientations at which the robotic system may record optical images of the inventory structure through all or select cameras in the robotic system during a scan cycle. More specifically, the system can automatically configure initial RFID and/or optical scan parameters for an inventory structure in the store based on data stored in the planogram before the robotic system executes a first scan cycle (or "first cycle count") in the store (or before the robotic system executes a first scan cycle in the store after the store is reconfigured or otherwise rearranged), such as shown in FIGS. 4 and 5.

In one implementation, the computer system: aggregates a target stock list of product units (e.g., SKUs) assigned to an inventory structure by the current planogram of the store; and queries a product database to determine which products in the target stock list are known to have integrated RFID tags or RFID tags incorporated into product packaging, such as for current versions of these products and versions of these products up to six months of age. In this implementation, if at least one product assigned to the inventory structure is thus determined to incorporate an RFID tag, the computer system can specify that the robotic system interrogate the entire length of the inventory structure, segments of the inventory structure containing these RFID-tagged products, or singular slots of the inventory structure containing these RFID-tagged products. The robotic system can thus collect identifying information—including product quantity and approximate location—from these RFID-tagged products arranged on this inventory structure while executing a scan cycle in the store. The robotic system can also record optical images of the inventory structure during this scan cycle. The computer system can then merge both optical and RFID data recorded by the inventory structure during this scan cycle—as described below—to: estimate the quantities of products not tagged with RFID tags from these optical data; to confirm quantities of RFID-tagged products from these RFID data; and to characterize orderliness of the inventory structure from these optical data.

However, if the computer system determines that no product assigned to the inventory structure includes an RFID tag, the computer system can specify that the robotic system record optical images of the inventory structure exclusively rather than broadcast an RFID interrogation signal while traversing along this inventory structure; the computer system can thus rely exclusively on optical data recorded by the robotic system while traveling along the inventory structure to estimate the quantity of products—not tagged with RFID tags—on this inventory structure and to characterize orderliness of this inventory structure.

Alternatively, the robotic system can record optical images of the inventory structure, broadcast RFID interrogation signals, and record any returned RFID values (and other metadata) by default while traversing a path along the inventory structure during a scan cycle. By collecting these RFID data—even despite absence of an RFID-tagged product assigned to the inventory structure—while traversing a path along an inventory structure, the robotic system can thus enable the computer system to: detect and track the inventory structure if tagged with its own RFID tag; track other RFID-tagged infrastructure arranged nearby; and detect RFID-tagged products improperly placed on the inventory structure at the time of the scan cycle.

Once the inventory structure (or a particular segment or specific slot of the inventory structure) is thus designated for RFID interrogation by the robotic system during a scan cycle, the computer system can also calculate an offset distance for the robotic system to the inventory structure and an interrogation power for the robotic system. For example, the computer system can set a minimum offset distance from the robotic system to the inventory structure that locates products on the top shelf and the bottom shelf of the adjacent inventory structure within the field of view of a RFID antenna on the robotic system, such as given a known arrangement of RFID antenna on the robotic system. For each section of the inventory structure, the system can then set an interrogation power at which an interrogation signal broadcast by the robotic system may sufficiently power RFID-tagged products—across the full height of the inventory structure—to return RFID values to the robotic system given the calculated offset distance. To calculate interrogation power at each section of the inventory structure, the computer system can also account for a density of RFID-tagged products assigned to this section of the inventory structure, a material or density of products assigned to the section of the inventory structure, and/or a material or layout of the inventory structure (e.g., metal shelves, wood-product display panel) that may affect propagation of radio signals between the robotic system and RFID-tagged products. The computer system can additionally or alternatively calculate a maximum interrogation power at which the robotic system may not receive RFID values from RFID-tagged products on an adjacent inventory structure—such as given the offset distance and known positions of inventory structures throughout the store—thereby enabling the robotic system to interrogate RFID tags arranged on a single inventory structure at a given time to reduce RFID value collisions while scanning a single inventory structure. Similarly, the computer system can implement parametric models to calculate an offset distance from the robotic system to the inventory structure and a matching interrogation power for scanning an inventory structure based on any of the foregoing parameters.

With the offset distance and interrogation power thus set for the inventory structure, the computer system can also set a scan speed and an interrogation frequency for the inventory structure, such as inversely proportional to a density of RFID-tagged products assigned to the inventory structure and inversely proportional to the interrogation power assigned to the inventory structure.

Furthermore, in the variation described below in which the robotic system records optical images of the inventory structure—from which the computer system may detect product units excluding RFID tags and/or track orderliness of product units on the inventory structure—the computer system can: set an offset distance from the robotic system to the inventory structure based on a height of the inventory structure (e.g., stored in the planogram) and characteristics of cameras on the robotic system in order to locate the full height of the inventory structure within the fields of view of cameras in the robotic system; and then set an RFID interrogation power, RFID frequency, and scan speed of the robotic system along the inventory structure based on this image-based offset distance.

However, the system can implement any other methods or techniques to calculate initial RFID scan parameters for the inventory structure. The robotic system can thus calculate initial RFID scan parameters for the inventory structure based on data stored in the planogram of the store. Later, the robotic system can implement these initial RFID scan parameters when scanning the inventory structure during a first scan cycle inside the store. Based on data collected by the robotic system during this scan cycle, the robotic system and/or the computer system can modify RFID interrogation powers, an offset distance from the inventory structure, a scan speed along the inventory structure, and/or a scan frequency along the inventory structure, etc. in order to improve inventory accuracy for the inventory structure and inventorying speed of the robotic system.

The computer system can implement these methods to calculate initial RFID scan parameters for each other inventory structure in the store based on data stored in the planogram of the store. The robotic system and the computer system can similarly cooperate to modify these RFID scan parameters for each inventory structure in the store based on RFID data collected by the robotic system during a scan cycle in the store.

5.2 Waypoints

In one implementation, the system can define an ordered set of waypoints throughout the store and can write RFID (and optical) scan parameters to each waypoint. When generating waypoints for the store, the computer system can offset waypoints from an inventory structure of interest, define a density of waypoints along the inventory structure of interest, and set an initial interrogation signal power level based on: the type of the inventory structure; based on proximity to other inventory structures; based on product types assigned to the inventory structure of interest by the planogram; etc.

For example, if the planogram indicates that a region of an inventory structure is populated with products containing metal or wrapped with metallic packaging, the computer system can flag waypoints adjacent this region of the inventory structure for optical scans only. In another example, if the planogram indicates that a region of an inventory structure is populated with products containing thick or dense material (e.g., jeans, a box of dry laundry detergent, bottled beverages), the computer system can define a higher density of waypoints nearer this region of the inventory structure and set an elevated default output power level for these waypoints in order to ensure sufficient power of interrogation signals reaching RFID tags near these waypoints given materials and densities of products in this region of the inventory structure. In yet another example, if the planogram indicates that another inventory structure is particularly close to the inventory structure of interest, the robotic system can define waypoints nearer the inventory structure of interest and set a reduced initial output power level for these waypoints in order to prevent interrogation signals broadcast at these waypoints from bleeding into RFID tags arranged on product placed on this nearby inventory structure. In another example, if the planogram indicates that an inventory structure of interest is metallic (e.g., steel) and/or that a high density of products is stocked on this inventory structure, the computer system can set a higher initial output power level for waypoints along this inventory structure in order to ensure sufficient power of interrogation signals reaching RFID tags given the material of the inventory structure and the anticipated density of products on the inventory structure.

In another example, the computer system can identify an inventory structure as located along a shoe aisle and determine that boxes of shoes are stocked in cubbies in the inventory structure based on data contained in a planogram of the store. In this example, the computer system can then define a set of waypoints centered along each column of cubbies in the inventory structure and set a high output power level for interrogation signals broadcast at each of these waypoints in order to ensure that RFID tags—integrated into soles of shoes stocked in these cubbies—are sufficiently powered to broadcast RF signals back to the robotic system occupying these waypoints. In a similar example, the computer system can: determine that an inventory structure represents a hanging clothing rack stocked with hanging shirts based on data contained in the planogram of the store; then define a sequence of waypoints encircling the inventory structure; and specify a lower output power level for interrogation signals broadcast at each of these waypoints given lower density of materials between product stocked on the inventory structure and the robotic system at each of these waypoints. In yet another example, the computer system can: identify an inventory structure stocked with canned goods based on the planogram of the store; label the inventory structure as unsuitable for an RFID scan; and label waypoints defined along this inventory structure with triggers for optical scans only.

Therefore, the computer system can define a set of waypoints along (or encircling) inventory structures throughout the store based on product and inventory structure data stored in a planogram of the store and can associate each waypoint with a set of initial scan parameters. In particular, the computer system can label each waypoint with: an initial linear and angular offset of (0, 0, 0°) from the original position and orientation specified by a waypoint; initial output power level of an interrogation signal broadcast at the waypoint; and whether an RFID scan and/or an optical scan is to be performed at the waypoint; etc. However, the computer system can implement any other methods or techniques to define a set of waypoints and initial scan parameters for each waypoint for the store.

The computer system can then upload these waypoints and initial scan parameters to the robotic system, such as over a wireless computer network connection.

5.3 Continuous Scanning

Alternatively, the computer system can define a continuous path along a shelving segment, a shelving structure, an aisle, a set of inventory structures, or throughout the entire store with fixed or varying RFID interrogation (and imaging) parameters—such as parametric or non-parametric offset distances, interrogation powers, robotic system speeds, and/or interrogation frequencies—along the continuous path.

6. Scan Cycle+Scan Routine

Figure 6:
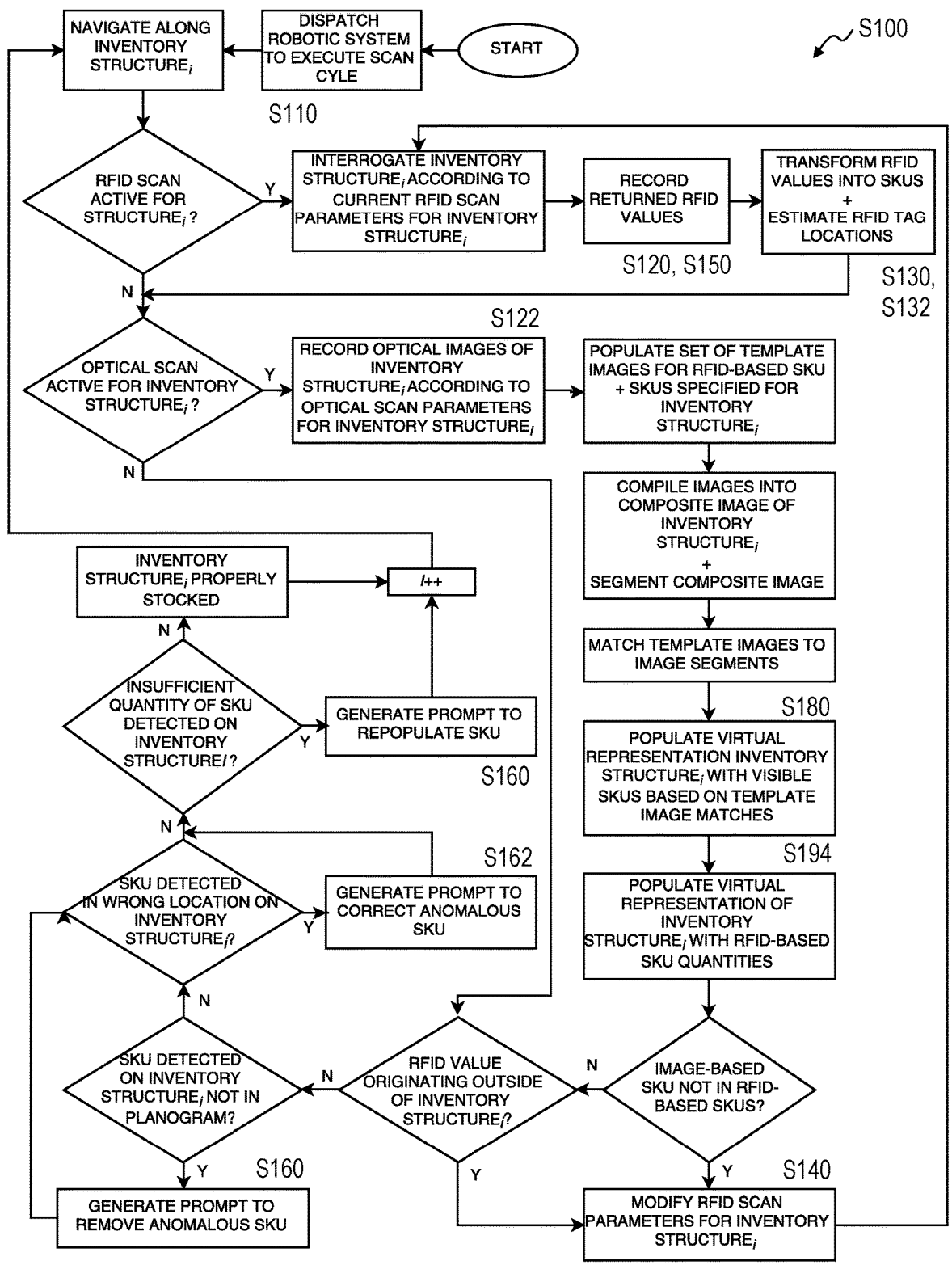
FIG. 6 is a flowchart representation of one variation of the method.

Block S120 of the method recites, at the robotic system, accessing a first set of scan parameters, navigating to a first waypoint in the set of waypoints according to the first set of scan parameters, outputting a radio frequency interrogation signal according to the first set of scan parameters, and collecting a first set of identification signals from RFID tags coupled to products arranged on a first inventory structure adjacent the first waypoint. Generally, in Block S120, the robotic system navigates to a waypoint, orients itself to the waypoint, outputs an interrogation signal according to the initial scan parameters associated with the waypoint, records inbound RF signals, (records one or more images of an adjacent inventory structure if specified in the initial scan parameters) and then repeats this process for a next waypoint, such as according to a waypoint order set by the computer system and until the autonomous vehicle has completed a scan routine at each waypoint specified for the current scan cycle, as shown in FIGS. 1, 4, and 6.

In one implementation, when executing a scan routine at a waypoint in the specified in the current scan cycle, the robotic system: collects inbound RF signals; isolates distinct RFID values (e.g., UUIDs) from the inbound RF signals; stores these RFID values in memory; and tags or otherwise links each RFID value with metadata. For example, the robotic system can tag an RFID value with: power of the corresponding inbound signal; a time or time difference of arrival of the inbound RF signal; an identifier or known position and orientation of the RFID antenna that received the inbound RF signal; a unique identifier of the waypoint at which the inbound RF signal was received; an actual position and orientation of the robotic system when the inbound RF signal was received; a current time of day and date; a unique identifier of the store; ID, etc.

6.1 Multiple Scan Routines Per Waypoint

In one variation, the robotic system executes multiple scan routines at unique positions and/or orientations at one waypoint. For example, for a first waypoint, the robotic system can: execute a first scan routine, as described above, at an initial linear and angular offset of (0, 0, 0°) from an original position and orientation and at an initial output power level specified by the first waypoint; and then execute a second scan routine at a second linear and angular offset of (0, −10 cm, +15°) from the original position and orientation and at an increased output power level 5% greater than the initial output power level. As described above, the robotic system can tag each RFID value recorded during the first and second scan routine with relevant metadata, including the actual location and orientation of the robotic system during a corresponding scan routine and the output power level of the corresponding interrogation signal.

In this variation, the robotic system can execute multiple scan routines per waypoint, including adjusting one or more of: a linear offset from an original location defined by the waypoint (i.e., a distance from an adjacent inventory structure of interest); an angular offset from an original orientation defined by the waypoint (i.e., an angular offset from RFID tags coupled to product units on the adjacent inventory structure); and output power level; etc. between scan routines at one waypoint. By thus executing multiple scan routines according to different scan parameters at one waypoint, the autonomous vehicle can increase probability that an interrogation signal broadcast by the robotic system at a waypoint will excite substantially all RFID tags on product units on the adjacent inventory structure, thereby ensuring that these RFID tags return RFID values to the robotic system and thus enabling the system can accurately record inventory on the inventory structure.

Once the robotic system completes one or more scan routines at a waypoint, the robotic system can navigate to a next waypoint and repeat this process for each other waypoint defined for the store.

7. Product Identification

Block S130 of the method recites generating a list of product units arranged on the first inventory structure based on the first set of identification signals. Generally, in Block S130, the robotic system can offload RFID values (e.g., UUIDs) collected during one or more scan cycles to the computer system, such as via a wireless computer network connection, and the computer system can identify a product (e.g., a "SKU") and related data corresponding to each of these RFID values. For example, in Block S130, the computer system can generate a list of product units—comprising quantities of unique stock keeping units stored on the first inventory structure—from RF signals collected by the robotic system while traversing a path or waypoints along the inventory structure based on associations between stock keeping units and unique wireless identification signals stored in a name mapping system, as shown in FIGS. 1 and 4.

In one implementation, the robotic system uploads RFID values and related metadata to the computer system in real-time; for each RFID value, the computer system passes the RFID value into a name mapping database to retrieve a SKU and related data (e.g., a serial number, a supplier identifier, a date of manufacture, etc.) of a unit of product linked to the RFID value. Alternatively, the robotic system can upload RFID values and related metadata to the computer system once a scan routine (i.e., one or more scan cycles at each waypoint defined for the store) is complete, such as once the robotic system returns to its dock or once the robotic system reaches a location within the store exhibiting (substantially) strongest wireless computer network connection.

Yet alternatively, the computer system can maintain a name mapping database containing links between product data and RFID values for products known to be stocked in the store and can preload this name mapping database onto the robotic system prior to executing a scan routine through the store; the robotic system can thus implement the foregoing methods and techniques to access SKU and other product data for each RFID value collected during scan cycles executed throughout the store.

8. RFID Tag Locations

In one variation shown in FIGS. 4 and 6, the method further includes: approximating locations of product units, in the first list of product units, arranged on the first inventory structure based on characteristics of corresponding wireless identification signals in the first set of wireless identification signals in Block S132; detecting a first product location difference between locations of product units, in the first list of product units, and corresponding product locations assigned to the first inventory structure by the planogram in Block S162; and generating a second stock correction prompt for the first inventory structure based on the first product location difference in Block S110. Generally, in this variation, the system (e.g., the robotic system or the computer system) estimates locations in real space—such as relative to the robotic system or within a virtual coordinate system defined for the store—at which RF signals received by the robotic system during a scan routine originated based on qualities of these RF signals. For example, the computer system can generate a multi-dimensional map of locations of product units arranged on an inventory structure based on: strengths of RF signals received by RFID antennas in the robotic system; phase (e.g., time) offset of identical RF signals received by multiple offset RFID antennas in the robotic system; a known location or footprint of the inventory structure within the store relative to the virtual coordinate system; a known location of the robotic system relative to the virtual coordinate system when these RF signals were received, such as in real-time during the scan cycle or asynchronously once the robotic system completes the scan cycle.

In one implementation, the system implements angle of arrival (e.g., time of arrival), phase (e.g., time difference of arrival), RSSI (e.g., signal strength), or other techniques to transform metadata stored with a first RFID value into a distance from an RFID antenna in the robotic system that received the corresponding RF signal to an RFID tag that transmitted the first RF signal during a first scan cycle at a first waypoint. The robotic system includes multiple RFID antennas and can receive this RF signal from the first RFID tag at multiple RFID antennas. Therefore, the system can: implement the foregoing process to calculate distance between these multiple RFID antennas and the first RFID at the first waypoint; and then triangulate a 2D or 3D position of the first RFID tag relative to the virtual coordinate system defined for the store based on the actual location and orientation of the robotic system during the first scan cycle and known offset distances and angles between RFID antennas in the robotic system. The system can also calculate distances between the RFID antennas and the first RFID tag based on receipt of the corresponding RF signal from the first RFID tag during other scan cycles at the same or adjacent waypoints and then triangulate the 2D or 3D position of the first RFID tag relative to the virtual coordinate system further based on these additional distances and known locations and orientations of the robotic system at during these other scan cycles.

Therefore, the system can localize the first RFID tag to a discrete volume in real space in the store, such as to within a one-square-meter or one-square-foot plan area or to within a one-cubic-or one-cubic-foot volume defined relative to the virtual coordinate system assigned to the store. The system can repeat this process for each other RF signal received during scan cycles at a waypoint to construct a virtual 2D plan or 3D volume of locations of RFID tags near the waypoint. The system can then stitch 2D plans or 3D volumes of locations of RFID tags generated for each of multiple waypoints into a 2D plan or 3D volume of locations of RFID tags throughout the entire store.

In this variation, the system can also confirm that an RFID value received by the robotic system originated at an RFID tag on (or in) a product unit currently occupying a known inventory structure—rather than a shoppers' cart or basket or a floor of the store. For example, for a particular wireless identification signal received by the robotic system when occupying both a first position adjacent the inventory structure and a second position adjacent the first inventory structure during the first period of time, the system can triangulate a particular location of the particular product unit within the virtual coordinate system defined for the store based on the first position and the second position of the robotic system when this particular wireless identification signal was received. In this example, the system can then determine (or confirm) occupation of the particular product unit on this inventory structure in response to the particular location of the particular product unit intersecting a known volume of the first inventory structure, also defined in the virtual coordinate system.

However, the system (e.g., the robotic system locally or the computer system remotely) can locate RFID tags throughout the store in any other way based on RFID values and related metadata collected during scan cycles executed by the robotic system.

9. Inventory Structure Tracking

In one variation shown in FIG. 4, inventory structures throughout the store are labeled with RFID tags or include integrated RFID tags loaded with substantially unique identifiers. In this variation, the system can track types, configurations, and locations, etc. of these inventory structures based on RFID values received by the robotic system during a scan cycle throughout the store.

For example, an interrogation signal broadcast by the robotic system during a scan cycle can excite both RFID tags arranged on product units and RFID tags arranged on inventory structures, shelves installed on inventory structures, product hangers attached to inventory structures, etc. Upon receipt of RFID values from RFID tags in the field, the robotic system can tag these RFID values with the robotic system's position and orientation in the store, power of RF signals carrying these RFID values, and/or receipt times of these RF signals at one or more antennas in the robotic system, etc. The system can then implement methods and techniques described above: to identify—in these RFID values received by the robotic system—an identifier of an inventory structure; and to determine a location of the inventory structure in the store, such as by triangulating the location of the inventory structure within the virtual coordinate system defined for the store based on a position and orientation of the robotic system at a time of receipt of this identifier of the inventory structure. In this example, the system can also populate a catalog of infrastructure deployed in the store with the identifier of the first inventory structure and the location of the first inventory structure in the store, such as in the form of a lookup table, spreadsheet, or 2D visual map of the store.

The system can implement similar methods: to detect and locate shelves, hangers, tables, freestanding racks, refrigeration units, etc. within the store based on RFID values received by the robotic system during scan cycles throughout the store; and to populate a catalog of these other infrastructure deployed in the store.

10. Closed-Loop RFID Interrogation Parameters

Block S140 of the method recites, in response to a difference between the list of product units in the first set of identification signals and a target stock list of the first inventory structure defined by a planogram of the store, defining a second set of scan parameters differing from the first set of scan parameters. Block S150 of the method recites, at the robotic system, navigating to the first waypoint in the set of waypoints according to the second set of scan parameters, outputting a radio frequency interrogation signal according to the second set of scan parameters, and collecting a second set of identification signals from RFID tags coupled to products arranged on the first inventory structure. Generally, in Blocks S140 and S150, the system implements closed-loop controls to determine whether to execute an additional scan routine at a particular waypoint and to adjust scan parameters for another scan routine at the particular waypoint based on differences between inventory actually identified from RFID values received during a scan routine at the particular waypoint and inventory expected to be present at the particular waypoint, as shown in FIGS. 1 and 6.

In particular, the robotic system (or the remote computer system) can modify RFID interrogation parameters (e.g., interrogation power, inventory structure offset distance, robotic system speed, interrogation frequency, robotic system yaw orientation, etc.) based on data collected by the robotic system during a scan routine along an inventory structure in order to: ensure that RFID values are read from all RFID-tagged product units on the inventory structure; and/or improve accuracy of localization of these RFID tags. For example, the robotic system (or the remote computer system) can execute these closed-loop controls in real-time as the robotic system completes a scan routine at a single waypoint adjacent an inventory structure or as the robotic system traverses a short, continuous path along the inventory structure. Alternatively, the robotic system (or the remote computer system) can execute these processes asynchronously, such as once a scan of the inventory structure is completed or once the current scan cycle for the entire store is completed.

10.1 Low Quantity of RFID Values Received

In one implementation, the computer system: determines a target quantity of discrete product units—known to include RFID tags—assigned to an inventory structure by the planogram of the store; associates this target quantity of discrete product units with a set of waypoints defined along the inventory structure; and tags this set of waypoints with this target quantity before loading the set of waypoints onto the robotic system in Block S110. During execution of the set of waypoints, the robotic system implements methods and techniques described above to collect RFID values from RFID tags proximal the set of waypoints and counts a total quantity of unique RF signals collected during scan routines along this the set of waypoints. The robotic system can then repeat scan routines along this set of waypoints if certain conditions are met.

In the foregoing implementation, the robotic system can flag the set of waypoints for a second set of scan routines if the target quantity of products assigned to the inventory structure by the planogram exceeds the actual quantity of unique RFID values collected along the set of waypoints by more than a preset threshold, such as: by a static difference of 5% for all inventory structures in the store; by 5% during low-traffic hours and by 15% during high-traffic hours; by a difference threshold proportional to a value (e.g., composite of margin and sale rate) of products assigned to the inventory structure (e.g., between 2% for high-value products and up to 15% for low-value products); etc. For example, the computer system can repeat a scan cycle at each waypoint in the set at an increased interrogation signal output power level in Block S150. In another example, the robotic system can: adjust a target orientation of the robotic system at each waypoint (e.g., by 15° to shift the plane of propagation of the interrogation signal out of the plane of RFID tags not previously detected); increase the density of waypoints along (or around) the inventory structure (e.g., to achieve greater overlap of interrogation signals at the inventory structure); and/or shift these waypoints further away from the inventory structure (e.g., to enable the interrogation signal to reach product units on shelves at the top and/or bottom of inventory structure). By thus implementing different power, distance, and/or orientation parameters when executing additional scan routines at waypoints along this inventory structure, the system can increase likelihood that any RFID tags—on product units stocked on the inventory structure—that were obscured from interrogation signals broadcast by the robotic system during the previous scan routine are excited during this next scan routine and thus return RFID values back to the robotic system, thereby increasing accuracy of inventory data collected by the robotic system for this inventory structure during the current scan cycle.

The robotic system can then calculate a union of RFID values received from RFID tags on product units on the inventory structure during the first and second scan routines. The robotic system can also repeat Blocks S140 and S150 until: increased interrogation power and/or other interrogation parameter changes no longer return additional RFID values from the inventory structure; or until another condition described below is met.

In this implementation, the robotic system can (in cooperation with the computer system) adjust scan parameters (e.g., output power level, orientation, waypoint position, waypoint density, etc.) and repeatably scan an inventory structure of interest within the store according to these adjusted scan parameters in Blocks S140 and S150 until few or no new RFID values are collected from one scan cycle to the next or until the actual number of unique RFID values collected during a scan cycle substantially matches the target number of product packagings specified for the inventory structure in the planogram, which may represent a sufficiently high degree of confidence in the completeness of a list of product packagings—currently stocked on the inventory structure—represented by RFID values collected along the inventory structure. Alternatively, the robotic system can repetitively execute scan cycles along the inventory structure: until a maximum time allocated to execute scan cycles at the set of waypoints expires; or until a rescan limit (e.g., a maximum of three scan cycles per waypoint) for the inventory structure is reached.

10.2 Overabundance of RFID Values Received

Alternatively, if the quantity of unique RFID values recorded by the robotic system while scanning waypoints along the inventory structure exceeds the target quantity of products assigned to the inventory structure by the planogram, the robotic system can implement similar methods and techniques to adjust scan parameters to compensate for this overabundance of unique RFID values received from product units on (and near) the inventory structure and then repeat scan routines along this autonomous vehicle according to this modified scan parameters. For example, receipt of too many unique RFID values may be the result of exciting RFID tags on product unit on a second inventory structure nearby due to excessive power of the interrogation signal output by the robotic system at these waypoints; the robotic system can therefore repeat scan routines at these waypoints but at reduced interrogation signal power in order to avoid exciting RFID tags on other inventory structures nearby. The robotic system can additionally or alternatively shift these waypoints closer to the inventory structure in order to avoid powering RFID tags on other inventory structures nearby (e.g., a second inventory structure on the same aisle and facing the inventory structure). The robotic system can then: repeat scan routines at waypoints along the inventory structure to collect a new set of unique RFID values received from RFID tags on products units stocked on the inventory structure; and calculate an intersection of RFID values received during the previous and current scan routines along this inventory structure. The robotic system can also repeat Blocks S140 and S150 until: decreased interrogation power and/or other interrogation parameter changes yield scan results that begin to exclude RFID values assigned to the inventory structure and that were received during immediately-preceding scan routines executed along the inventory structure; or until another condition, such as described above, is met.

Therefore, the robotic system can implement closed-loop controls to adjust scan parameters and repeat scan routines along the inventory structure of interest based on the target quantity of products allocated—according to the planogram—for the inventory structure of interest. The robotic system (or the computer system) can also store last scan parameters executed by the robotic system for this inventory structure; during a next scan cycle along this inventory structure, such as around the same time on the following day, the robotic system can scan the inventory structure of interest according to these stored scan parameters.

In a similar example, after broadcasting an interrogation signal during a scan routine adjacent a first inventory structure according to a first set of wireless scan parameters (e.g., a first power, a first orientation, and first offset distance from the first inventory structure), the robotic system can record a set of wireless identification signals from RFID tags on product units on the first inventory structure in Block S120. The computer system can then transform this first set of wireless identification signals into a first list of product units currently stocked on the first inventory structure and compare this first list of product units to a first target stock list assigned to the first inventory structure by the planogram of the store. In Block S140, if this first list of product units includes a particular product unit excluded from the first target stock list assigned to the first inventory structure and if this particular product unit is assigned to a second inventory structure adjacent the first inventory structure, the computer system can generate (or calculate) a second set of wireless scan parameters, such as specifying a second interrogation power less than a first interrogation power specified in the first set of wireless scan parameters and/or a lesser offset distance from the first inventory structure. The robotic system can then: navigate along the first inventory structure; broadcast radio frequency interrogation signals according to the second set of wireless scan parameters; and record a second set of wireless identification signals returned by radio frequency identification tags coupled to product units arranged on the first inventory structure in Block S150. In Block S132, the computer system can then repeat the foregoing methods and techniques to generate a second list of product units arranged on the first inventory structure based on this second set of wireless identification signals recorded by the robotic system. If the second list of product units includes all product units from the first list of product units assigned to the first inventory structure and excludes the particular product unit assigned to the second inventory structure, the computer system can assign the second set of wireless scan parameters to the first inventory structure, and the robotic system can implement these stored wireless scan parameters when scanning the first inventory structure during subsequent scan cycles. Otherwise, the computer system and robotic system can further cooperate to tune wireless scan parameters for the first inventory structure until these wireless scan parameters yield high selectivity to interrogating RFID tags on product units on the first inventory structure to the exclusion of RFID tags on products on inventory structures nearby.

10.3 SKUs

In another implementation, the computer system: accesses the planogram of the store to identify unique SKUs and quantities of each unique SKU assigned to an inventory structure of interest; compiles these SKU quantities for the inventory structure into a target product list (or matrix, lookup table, or other container); links this target product list to a set of waypoints for the inventory structure; and uploads the target product list with the set of waypoints to the robotic system. During execution of a scan routine at each waypoint in this set, the robotic system can: collect RFID values from RFID tags on products stored on this inventory structure; pass these RFID values through a (local or remote) name mapping system to access SKUs of products labeled within these RFID tags; compile these SKUs into a list of actual products stored on the inventory structure of interest; and then identify differences between the list of unique product units and target product list.

In this implementation, following execution of scan routines along the inventory structure, the robotic system can generate a first list of unique SKUs represented in the list of unique product units but not in the target product list. The robotic system can then: predict that the first list of unique SKUs represents misplaced products on and near the inventory structure of interest—such as products selected by shoppers from other inventory structures and later discarded onto the inventory structure of interest—if the first list of unique SKUs is small (e.g., less than 2% of the length of the target product list); and remove the first list of unique SKUs from the list of unique product units when calculating the actual inventory state of the inventory structure. The system can also: implement methods and techniques described above to approximate the 2D or 3D location of a particular RFID tag that broadcast an RF signal that was interpreted as a particular SKU in the first list of unique SKUs; access product information of this particular SKU, as described above; generate a task specifying the approximate location of the particular RFID tag, product information of the particular SKU, and a prompt to remove a unit of the particular SKU from the inventory structure of interest; and then transmit this task to an associate of the store, thereby guiding the associate to correct misplaced products throughout the store.

Alternatively, in the foregoing implementation, if the first list of SKUs is large (e.g., more than 2% of the length of the target product list), the robotic system can determine that the first list of SKUs are represented by RFID values received from RFID tags applied to products stocked on other inventory structures nearby. The robotic system can thus repeat scan routines at waypoints along the inventory structure of interest but at lower interrogation signal output power levels and/or with waypoints shifted closer to the inventory structure of interest—as described above—in order to avoid exciting RFID tags on products on other inventory structures nearby when the robotic system broadcast an interrogation signal to products units on the inventory structure of interest.

In the foregoing implementation, the robotic system can also calculate a second list of SKUs contained in the target product list but not in the list of unique product units generated from RF signals collected during scan routines at waypoints along the inventory structure of interest. In this implementation, if the second list of SKUs is small (e.g., less than 1% of the length of the target product list or less than a static or dynamic threshold proportion assigned to the inventory structure, as described above), the robotic system can label the inventory structure of interest as properly stocked and move to waypoints associated with a next inventory structure in the store. Otherwise, the robotic system can: adjust scan parameters for waypoints along the inventory structure, as described above, such as by increasing output power level, shifting waypoints closer to the inventory structure of interest, adjusting the angular (i.e., yaw) offset associated with waypoints along the inventory structure (e.g., by 15°), and/or increasing density of waypoints along the inventory structure in Block S140; repeat scan routines at these waypoints along the inventory structure to collect a new set of RFID values in Block S150; merge the RFID values collected during the previous and current scan routines along the inventory structure into a revised list of unique product units of product units stocked on the inventory structure; and repeat the foregoing processes according to the revised list of unique product units until one of various conditions described above are met.

10.4 Scan Routine Repetition

Therefore, in response to a difference between a first list of product units detected on a first inventory structure—via RF signals received by the robotic system when scanning the first inventory structure according to initial wireless scan parameters—and a target stock list of product units known to contain RFID tags and assigned to the first inventory structure by the planogram, the system can define a modified set of wireless scan parameters for scanning the first inventory structure in Block S140, as shown in FIGS. 1 and 6.

The computer system and the robotic system can implement these methods and techniques in Block S140 discontinuously, such as upon conclusion of the current scan cycle or upon conclusion of a scan of the first inventory structure. For example, upon conclusion of a first scan of the first inventory structure, the robotic system can immediately rescan the first inventory structure according to revised wireless scan parameters calculated by the computer system according to results of the first scan. The computer system can then: transform RFID values received by the robotic system during this first and second scan of the first inventory structure into a first list and a second list of product units stocked on or located near the first inventory structure; calculate a union of these first and second lists of product units; calculate locations of these product units on or near the first inventory structure based on these consolidated scan data; and then determine whether the quantities and locations of these product units differ from the target stock list assigned to the first inventory structure. As described below, the computer system can then distribute prompts to correct product quantity differences and/or product location differences thus detected for the first inventory structure.

Alternatively, the computer system and the robotic system can implement these methods and techniques in Block S140 in real-time. For example, the robotic system can recalculate wireless scan parameters for scanning the first inventory structure based on RFID values received from local RFID tags following each broadcast of an interrogation signal by the robotic system, such as following execution of a scan routine at each waypoint along the first inventory structure, after traversing a target distance (e.g., ten centimeters) along the first inventory structure, or during an interval between each scan routine along the first inventory structure.

Therefore, the robotic system can redefine wireless scan parameters in real-time between a first scan routine and a second scan routine along the first inventory structure; navigate continuously along the first inventory structure from a location of the first scan routine to a location of the second scan routine; and transition from broadcasting radio frequency interrogation signals according to a first set of wireless scan parameters at the first location to broadcasting radio frequency interrogation signals according to a second set of wireless scan parameters at the second location while scanning the inventory structure. For example, in this implementation, the robotic system can vary its yaw orientation, its offset distance from the first inventory structure, and its RIFD interrogation power while moving along the first inventory structure, such as to traverse a serpentine path and sinusoidal yaw orientation along the first inventory structure.

However, the computer system and the robotic system can implement any other methods or techniques to tune or otherwise vary wireless scan parameters for scanning product units on inventory structures throughout the store.

11. Point of Sale and Restocking Data

In one variation, the system: interfaces with a restocking scheduler and with a point of sale system integrated into the store to track ingress of new products loaded onto the inventory structure throughout the store and to track egress or products from the store through sales; and updates quantities and/or types (e.g., SKUs) of products expected to be on the inventory structure throughout the store based on such product flux data. The robotic system can then implement these updated product quantity and/or type data when determining whether to repeat RFID scan routines at waypoints throughout the store in Block S140.

12. Off-Shelf Product Units

In another variation, the system identifies RF signals as originating from RFID tags arranged on or in product units carried in shopping carts, carried in shopping baskets, or discarded onto the floor. For example, the system can extract—from the planogram—2D plan areas or 3D volumes of inventory structures throughout the store. In this example, during execution of a scan routine along an inventory structure of interest, the robotic system can: collect RFID values from nearby RFID tags in Block S120; implement methods and techniques described above to determine 2D or 3D locations of RFID tags within the store based on these RFID values and related metadata; and flag RFID values located outside of known plan areas or volumes of inventory structures in the store. The system can then remove unique product units corresponding to these flagged RFID values from a list of product units stocked on an adjacent inventory structure such that this list of product units represents a substantially authentic summary of the stock state of the inventory structure and excludes product units currently occupying shoppers' carts or baskets or product units discarded onto a floor of the store.

In another example in which the robotic system is deployed in a retail environment including fitting rooms and in which this retail environment is stocked with products labeled with RFID tags (e.g., a clothing store stocked with clothing and accessories including integrated RIFD tags or RFID labels), the computer system can dispatch the robotic system to: navigate along inventory structures throughout the store; broadcast RFID interrogation signals toward these inventory structures; collect RFID values from products arrange on these inventory structures; and/or record optical images of these inventory structure during a scan cycle. The computer system can then derive an inventory of product units on these inventory structures throughout the store based on these RFID and/or optical data, as described above. However, during this same whole-store scan cycle or during a scan cycle dedicated to monitoring fitting rooms in the store, the computer system can also dispatch the robotic system to: navigate along and outside of these fitting rooms; broadcast RFID interrogation signals toward these fitting rooms; and collect RFID values from product units located inside these fitting rooms (e.g., product units previously left in these fitting rooms by patrons or carried into these fitting rooms by current occupants of these fitting rooms). The computer system can then implement methods and techniques described above to identify product units and to estimate locations of these product units located inside these fitting rooms based on RFID values collected by the robotic system during this scan cycle. The computer system and the robotic system can thus cooperate to record an inventory of loose product units located in fitting rooms in this store. The computer system can then leverage these loose product unit inventory information: to form a more accurate and comprehensive representation of the types and locations of many or all product units throughout the store; and to selectively prompt a store associate to return product units in these fitting rooms back to their respective inventory structures. The computer system can also host a search portal for store associates, return (near) real-time locations and quantities of product units stocked on inventory structures and/or left in fitting rooms in the store based on search terms entered by a store associate, and thus enable the store associate to quickly locate a particular product unit requested by a patron of the store (e.g., a last pair of jeans by a particular manufacturer, in a particular style, in a particular color, and in a particular size left in a particular fitting room in the store).

12.1 Spilled Product Units

In one implementation, the system distinguishes products discarded onto the floor of the store. For example, the system can: implement the foregoing methods and techniques to determine that a particular RFID value—collected during a first scan routine along an inventory structure of interest—corresponds to a particular RFID tag located outside of a 2D plan area or 3D volume associated with a nearest inventory structure of interest; and then repeat scan routines along this inventory structure at a later time (e.g., one minute later, fifteen minutes later) in Block S150. If the system receives the particular RFID value again during the second set of scan routines along the inventory structure and determines that the particular RFID tag is located at substantially the same position outside of the 2D plan area or 3D volume of the nearest inventory structure, the system can flag the particular RFID tag. The system can then: generate a task specifying the approximate location of the particular RFID tag, product information of a particular SKU linked to the particular RFID value, and a prompt to remove the product from an aisle facing the inventory structure of interest; and transmit this task to an associate of the store.

In a similar example, the computer system (or the robotic system) can: approximate locations of product units—in a first list of product units identified from a first set of RFID values received by the robotic system while scanning a first inventory structure—in the virtual coordinate system defined for the store based on characteristics of corresponding wireless identification signals recorded by the robotic system; detect a particular product unit—in this first list of product units—located below a threshold height and outside a known footprint of the first inventory structure (e.g., defined in 2D or 3D map of inventory structures throughout the store or in the planogram); and flag this particular product unit as a possible obstruction on the floor of the store (e.g., in an aisle adjacent the first inventory structure). Accordingly, the robotic system can: navigate to an orientation that positions a calculated location of the particular product unit within a field of view of an optical sensor in the robotic system, such as based on known properties of the optical sensor and a known position of the optical sensor on the robotic system; and then record an optical image (e.g., a 2D photographic image) through the optical sensor. This optical image may thus depict the particular product unit and an adjacent area of the store. The computer system can then: generate a spill correction prompt to remove the particular product unit from the floor of the store; append the optical image to the spill correction prompt; and then serve this spill correction prompt to a computing device associated with an associate of the store substantially in real-time.

The robotic system and the computer system can thus cooperate to: automatically detect an RFID-tagged product unit incorrectly occupying the floor of the store; to notify a store associate of this product unit as soon as this spill is detected; and to provide visual insight into the state of store where this spilled product unit was detected, which may enable the associate to more rapidly discern the nature of this spill, to discern the urgency of this spill, and to determine whether help or cleanup tools (e.g., a mop, a broom) are needed to correct this spill before physically arriving at the scene of this spill, which may further enable the associate correct the spill more quickly.

12.2 Product Units in Shopping Carts and Baskets

Similarly, the system can distinguish products contained in shopping carts or baskets. In the foregoing example, if the system does not receive the particular RFID value again during the second set of scan routines along the inventory structure of interest or does receive the particular RFID value again during the second set of scan routines but determines that the particular RFID tag has moved by a significant distance from its determined location during the first scan routine, the system can label the particular RFID tag as coupled to a product placed in a shopping cart or shopping basket. In this variation, the system can generate a list of product units currently in shopping carts in the store—but not yet purchased—accordingly.

Alternatively, RFID tags can be integrated into baskets and shopping carts supplied to customers of the store. Thus, when the robotic system outputs an interrogation signal via the RFID antenna when occupying a space in the store near a cart (or basket), the robotic system can receive RFID values from both products contained in a cart (or basket) nearby and the cart (or basket) itself. The system can then: associate an RFID value received from the cart with a set of RFIDs values received from products occupying the cart; detect co-location of the cart and these products accordingly; and disregard RFIDs received from these products when determining the stock state of shelves throughout the store while these products remain co-located with the cart. The system can also confirm co-location of these products in the cart based on persistent receipt of RFID values from both RFID tags arranged in these products and arranged in the cart over time, as described above.

13. Optical Scans

As described above and in U.S. patent application Ser. No. 15/347,689 and shown in FIGS. 4-7, the robotic system can also record one or more digital photographic images of an inventory structure during a scan cycle; and the computer system can process these images to identify product units stocked on the inventory structure, to identify price tags on slots on the inventory structure, to identify differences between actual and target stock states of the inventory structure, and/or to guide modification to wireless scan parameters implemented by the robotic system when scanning RFID tags on product units on this inventory structure.

13.1 Optical Product Unit Detection

Figure 7:
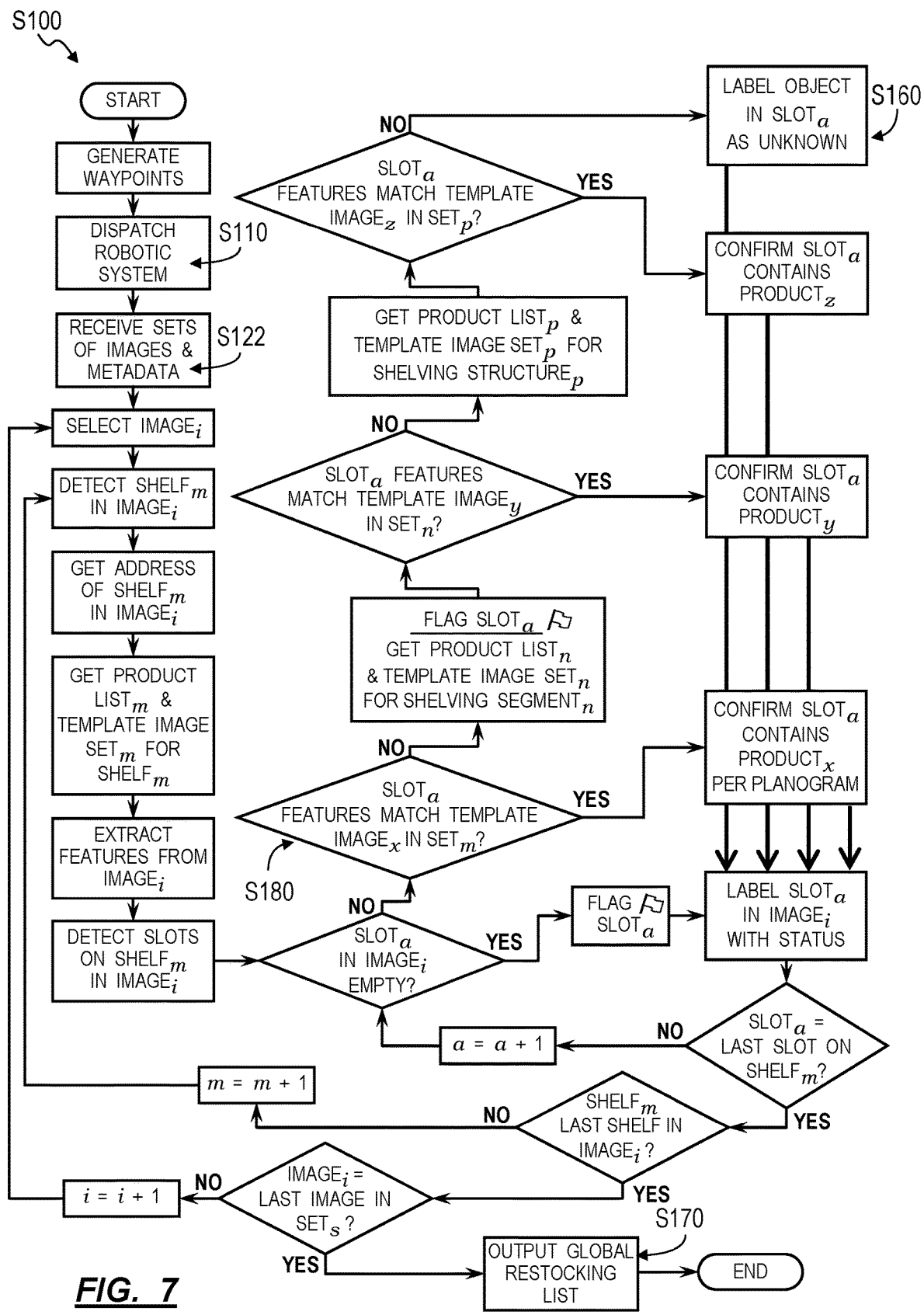
FIG. 7 is a flowchart representation of one variation of the method.

In one implementation shown in FIGS. 4 and 6, while the robotic system navigates along a first inventory structure and broadcasts an RFID interrogation signal toward the first inventory structure, the robotic system can also record one or more optical images of the first inventory structure in Block S122. As described in U.S. patent application Ser. No. 15/600,527, the computer system can then: compile this set of optical images recorded by the robotic system into a composite image of the first inventory structure; segment the composite image by shelving segment, shelf, or slot, etc.; retrieve—from a database of template images—a first set of template images, wherein each template image in this first set of template images contains visual features representative of a product in the first target stock list assigned to the first inventory structure; detect features in each segment of the composite image; identify template images that best match features detected in each segment of the composite image; and quantify product units, locations of product units, and orientations of product units (at the front of each slot) on the first inventory structure based on product information associated with template images matched to these segments in the composite image in Block S180, as shown in FIGS. 4 and 7. In particular, the computer system can identifying a set of product units stored on the first inventory structure based on correlations between: visual features represented in selected template images, in the first set of template images, of known products at known orientations; and clusters of features detected in segments of the composite image of the first inventory structure.

The robotic system can therefore collect optical images of the first inventory structure; and the computer system can implement computer vision techniques: to identify product units stored on the first inventory structure; and to determine locations and orientations of these product units. The computer system can then combine these image-based stock data for the first inventory structure with RFID-based stock data described above: to determine whether a correct product unit is occupying each slot on the first inventory structure; to determine whether a product unit occupying each slot on the first inventory structure is properly oriented (e.g., set at the front of the slot with the correct face of the product unit facing outwardly); and to determine quantities of product units stocked on the first inventory structure—even those product units that are visually obscured by other product units on the first inventory structure. The computer system can therefore leverage a combination of image-based and RFID-based stock data for the first inventory structure to achieve a more complete representation of the current stock state of the first inventory structure. The robotic system and the computer system can cooperate to extract similar insights from image-based and RFID-based stock data for other inventory structures throughout the store.

13.2 Selective Optical and RFID Scans

In this variation, the robotic system can selectively broadcast RFID interrogation signals and/or record optical images of inventory structures throughout the store based on whether products assigned to these inventory structures are known to include or exclude RFID tags, as shown in FIGS. 5 and 6.

For example, the robotic system can default to recording optical images of all inventory structures in the store, and the computer system can ascertain presence, location, and orientation of product units at fronts of slots in these inventory structures based on these optical images. For an inventory structure (or shelving segment) assigned at least RFID-tagged product, the robotic system can broadcast RFID interrogation signals along the length of this inventory structure or, more specifically, when occupying positions along the inventory structure adjacent target locations for each RFID-tagged product assigned to this inventory structure.

Alternatively, when navigating along an inventory structure assigned a target stock list including products known to contain RFID tags and excluding products known to exclude RFID tags, the autonomous vehicle can: broadcast radio frequency interrogation signals; record a second set of wireless identification signals returned by RFID tags coupled to product units arranged on the second inventory structure; and disable collection of optical images. From RFID values thus collected by the robotic system, the computer system can determine a stock state of the inventory structure and approximate locations of product units on the inventory structure, as described above, which may be faster and consume fewer resources than processing optical images of this inventory structure.

13.3 Product Unit Tracking: RFID+Images

In one implementation, the robotic system defaults to executing RFID scan routines along inventory structures throughout the store, and the system processes RFID values collected by the robotic system during these scan routines substantially in real-time to assemble lists of product units stored on these inventory structures. In this implementation, if the system determines that a list of unique product units stocked on an inventory structure deviates significantly from a target stock list for the inventory structure—such as if this list of unique product units contains unique SKUs not present in the target product list for the inventory structure, or if this list of unique product units contains many fewer unique SKUs than product quantities specified in the target product list for the inventory structure—the system can flag this inventory structure for optical imaging. The robotic system can then navigate along this inventory structure a second time and capture optical images of the inventory structure (and recollect RFID values from RFID-tagged product units on this inventory structure), such as at a tail end of the current scan cycle, during a next scan cycle, or immediately after completing a last RFID scan routine along this inventory structure during the current scan cycle.

After processing these optical images, as described above, the computer system can merge these RFID data and image-based stock data for the inventory structure to determine the stock state of the inventory structure, such as including which unique SKUs are stocked on the inventory structure, quantities of unique SKUs stocked on the inventory structure, locations and orientations of product facings on the inventory structure, and deviations from the target stock list defined for the inventory structure in the planogram.

Furthermore, in this implementation, when populating a set of template images of products for comparison to features detected in optical images of this inventory structure, the computer system can: calculate a union of unique products (e.g., unique SKUs) assigned to the inventory structure by the planogram and unique products detected in RFID data collected by the robotic system while traversing the inventory structure; and then aggregate a set of template images of all products in this union. By then implementing this set of template images to identify products in images of the inventory structure, the computer system may more rapidly identify both products assigned to the inventory structure and RFID-tagged products mistakenly placed on the inventory structure, such as by a patron of the store.

Therefore, because collection, offloading, and processing of images by the system may be time, bandwidth, data transfer, and computationally expensive compared to collection and analysis of RFID values, the system can selectively collect image data when additional optical information may aid in determining the stock state of an inventory structure.

13.4 Images then RFID

Alternatively, the robotic system can default to recording images of inventory structures at waypoints throughout the store and selectively flagging waypoints for RFID scan routines. For example, if the system determines from a set of images recorded along an inventory structure that a particular slot in the inventory structure is empty or possibly under-stocked (e.g., based on dark shadows behind a visible product facing in the slot or if the first product facing in the slot is offset toward the rear of the slot), the system can flag one or a subset of waypoints adjacent the particular slot for RFID scans and then trigger the robotic system to revisit these waypoints. The robotic system can then implement the foregoing methods and techniques to collect RFID values from RFID tags on products in and around the particular slot on the inventory structure; and the system can then analyze these RFID values to determine the actual quantity of the SKU assigned to the particular slot.

13.5 Optical-Based Closed-Loop RFID Scan Routines

In another implementation, the robotic system executes an RFID scan and records an image at each waypoint. In this implementation, the system can: identify each unique SKU represented in images of an inventory structure recorded during a scan routine along the inventory structure; and generate a ground-truth list of these unique SKUs. The system can also: generate an RFID-based list of unique SKUs linked to RFID values collected at waypoints along the inventory structure; and trigger the robotic system to repeat scan routines at waypoints along the inventory structure if the ground-truth list of unique SKUs contains SKUs not present in the RFID-based list of unique SKUs. Otherwise, the system can confirm sufficient accuracy of scan routines along the inventory structure and prompt the robotic system to move a next set of waypoints along another inventory structure in the store.

In one example shown in FIG. 6, the computer system can: compile a first list of product units represented in RFID data collected by the robotic system executing a first set of wireless scan parameters while traversing a path along a first inventory structure in the store; and identify a second set of product units stocked on the first inventory structure from one or more optical images of the first inventory structure recorded by the robotic system during this scan cycle. Then, in response to the second image-based set of product units containing a particular product unit excluded from the first RFID-based list of product units, the computer system can generate a second set of wireless scan parameters—such as specifying a second interrogation power greater than a first interrogation power specified in the first set of wireless scan parameters—intended to increase likelihood that the robotic system will read an RFID value from the particular product unit. The robotic system can then: navigate along the first inventory structure for a second time; broadcast radio frequency interrogation signals toward the first inventory structure according to the second set of wireless scan parameters; and record a second set of wireless identification signals returned by RFID tags coupled to product units arranged on the first inventory structure in Block S150. The computer system can then generate a second list of product units arranged on the first inventory structure in Block S132 based on this second set of wireless identification signals recorded by the robotic system during this second pass along the first inventory structure. If the second list of product units now includes the particular product unit, the computer system can assign the second set of wireless scan parameters to the first inventory structure, and the robotic system can default to implementing these wireless scan parameters during a next scan of the first inventory structure.

Therefore, the system can trigger the robotic system to repeat scan routines at waypoints along an inventory structure if the system identifies unique product facings in images of the inventory structure that are not similarly represented in RFID values collected during RFID scan routines along the inventory structure. The system can implement similar methods and techniques to confirm that a quantity of each unique product facing identified in images of the inventory structure is also represented in RFID values collected at waypoints along the inventory structure.

13.6 Spill Imaging

In the variation described above in which the system (or the robotic system) identifies a static RFID tag occupying a 2D or 3D location outside of a known footprint or volume of an inventory structure and in which the system labels the static RFID tag as a product discarded onto the floor, the system can: calculate a location and orientation of the robotic system at which this discarded product may fall into the field of view of a camera integrated into the robotic system; and trigger the robotic system to navigate to this location and orientation and then record an image through this camera. Upon receipt of this image from the robotic system, the system can append a notification for handling the discarded product, as described above, with this image.

13.6 Output Image

In another implementation shown in FIG. 3, the system: generates a 2D elevation image of an inventory structure, such as by stitching multiple discrete images recorded by the robotic system when occupying waypoints along the inventory structure into a single panoramic image of the inventory structure; implements methods and techniques described above to transform RFID values and related metadata collected by the robotic system when occupying the same waypoints into 2D plan or 3D locations of corresponding RFID tags within the store; and projects the 2D plan or 3D locations of these RFID tags onto the 2D elevation image of the inventory structure. The system can then: retrieve product data (e.g., SKU, serial number, data of manufacture, etc.) associated with each of these RFID values; and populate discrete regions of the 2D elevation image with corresponding product data in order to generate a visual representation of the inventory structure and unit-level product inventory in a single 2D visual document in Block S194.

In one example shown in FIGS. 4 and 6, the computer system can: approximate locations of product units arranged on a first inventory structure based on characteristics of corresponding wireless identification signals, in a set of wireless identification signals, recorded by the robotic system while scanning the first inventory structure; approximate locations of product units arranged on the first inventory structure based on locations of corresponding features detected at the set of images recorded by the robotic system while scanning the first inventory structure; and calculate a union of locations and identities of product units in this RFID-based list of product units and the image-based set of product units. The computer system can then: generate a virtual representation of the first inventory structure; and populate the virtual representation of the first inventory structure with representations of locations and identities of product units in this union of RFID- and image-based product unit lists. This virtual representation of the first inventory structure can thus represent identities and locations of both product units that are visible at the first inventory structure and product units that are hidden behind other product units on the first inventory structure. The computer system can then share this virtual representation of the first inventory structure with an associate of the store or otherwise make the virtual representation of the first inventory structure available to an associate of the store, such as through a web portal, to provide the associate with quick, visual insight into a 3D stock state of the first inventory structure.

In a similar example shown in FIG. 2, the computer system can: implement machine vision techniques to identify discrete slots on the inventory structure of interest in the 2D elevation image; and then populate the 2D elevation image of the inventory structure with one hotspot per slot or group of slots assigned the same SKU, wherein each hotspot contains a number of units of a SKU assigned to the slot(s) and suppliers, manufacturing dates, and/or serial numbers, etc. of products determined to be located in the slot(s) based on RFID values collected during the robotic system's occupation of nearby waypoints. The computer system can also: implement machine vision techniques to identify slots stocked with incorrect products; identify products occupying these slots based on RFID values collected by the robotic system while navigating along the inventory structure but not contained in a list of SKUs assigned to the inventory structure by the planogram; and write a hotspot—indicating SKUs and/or other relevant data—to slots stocked with incorrect products represented in the 2D elevation image of the inventory structure.

However, the computer system can merge digital photographic images and RFID-related data into any other visual representation of the stock state of an inventory structure of interest in the store. The computer system can implement similar methods and techniques to generate visual representations of other inventory structures throughout the store based on image- and/or RFID-based data collected by the robotic system during a scan cycle.

13.7 Price Tag Confirmation

In this variation, the computer system can additionally or alternatively: compile a first list of product units stocked on a first inventory structure from RFID data collected by the robotic system while navigating along the first inventory structure during a scan cycle; approximate locations of product units—in this first list of product units—arranged on the first inventory structure based on characteristics of corresponding wireless identification signals in the first set of wireless identification signals in Block S132, as described above; identify—in an optical image of the first inventory structure recorded by the computer system during the scan cycle—locations of and price values indicated by a set of price tags on the first inventory structure in Block S180; and then align locations of product units—estimated from RFID data collected by the robotic system while scanning the first inventory structure—to locations of price tags in the set of price tags detected in the optical image. For a particular product unit—in this first list of product units—the computer system can detect a price difference between a price assigned to the particular product unit and a price value indicated by an adjacent price tag in the set of price tags; and then generate a stock correction prompt to correct the adjacent price tag on the first inventory structure in response to detecting this price difference.

Therefore, in this implementation, the computer system can: detect price tags in an optical image of an inventory structure recorded by the robotic system; project locations of these price tags onto locations of product units calculated from corresponding RFID data collected substantially concurrently by the computer system (or vice versa); and link an optically-detected price tag to a product unit (or a cluster of product units) identified in RFID data collected by the robotic system based on physical proximity of the price tag and product unit(s). The computer system can then confirm whether a price value indicated in a price tag equals a price assigned to the corresponding product unit(s) (e.g., in the planogram or price database managed by the store) and then selectively prompt a store associated to correct the price tag if a difference is detected. For example, the computer system can transmit a location of the incorrect price tag and a correct price value for the price tag (or printable image for the correct price tag) to a mobile computing device associated with the store associate.

14. Digital Report+Restocking Prompts

Block S110 of the method recites generating a digital report of products stocked on the first inventory structure based on the second set of identification signals. Generally, in Block S110, the system aggregates a list of SKUs and their actual quantities represented by RFID values collected at waypoints throughout the store into a report of which SKUs are stocked in what quantities and at which locations throughout the store.

In one implementation the computer system generates an electronic restocking list containing a filtered list of slots at inventory structures throughout the store in need of correction, such as addition of product, exchange of product, or straightening of product. For example, the system can generate a stocking status graph, table, or list of improperly-stocked slots throughout the store, such as including a mis-stocking mode (e.g., too many facings, too few facings, misoriented packaging, damaged packaging, outdated packaging, under quantity, over quantity, incorrect product location, etc.) for each improperly-stocked slot in this list based on stock values extracted from RFID and/or optical data collected by the robotic system, as shown in FIGS. 1, 2, 4, and 6. In this implementation, the system can serve this graph, table, or list to the manager of the store via a manager portal, such as executing on a desktop computer, a laptop computer, a tablet, or a smartphone, etc.

The computer system can also generate a stock correction task list to correct improperly-stocked slots. In this implementation, the system can generate a prioritized list of tasks to move misplaced products, to restock empty or improperly-stocked slots, etc. and then serve this task list to an associate (e.g., employee) of the store via a native stocking application executing on a mobile computing device (e.g., a tablet, a smartphone) carried by the associate. In this implementation, the computer system can implement methods and techniques described in U.S. patent application Ser. No. 15/347,689 to prioritize this list of tasks to correct improperly-stocked slots throughout the store.

In one example, the computer system: detects omission of a first product entirely from a first slot on a first inventory structure in the store based on failure of the robotic system to read an RFID value corresponding to this first product while scanning the first inventory structure and failure to detect a unit of the first product in an optical image of the inventory structure; retrieves a first number of units of the first product assigned to the first slot by the planogram; generates a notification specifying an identifier (e.g., a SKU) of the first product, the number of units of the first product assigned to the first slot, a location of the first slot on the first inventory structure, and a location of the first inventory structure within the store; and then transmits the notification to a mobile computing device assigned to an associate of the store substantially in Block S110. In this example, the system can transmit the notification to the associate in real-time, such as if the first product is a high-value product determined to be empty during a high-traffic period at the store. Alternatively, the system can delay transmission of the notification to the associate until the robotic system completes a scan of the store, a full stock state of the store is determined from these scan data, and a list of restocking prompts is ordered according to values of these under- or mis-stocked products.

In this implementation, the system can receive inputs from the associate through the native stocking application to close tasks, and the system can later confirm that these tasks were properly closed based on images collected by the robotic system during the next scan cycle within the store. However, the system can output stocking status data in any other format in Block S110.

14.1 Product Quantity Difference

Therefore, the computer system can detect a product quantity difference that includes either of: a quantity of a particular SKU—in an RFID-based list of product units detected on an inventory structure—that exceeds a target count of the particular SKU specified for the inventory structure by the planogram of the store (e.g., in the target stock list for the inventory structure); and the target count of the particular SKU specified in the planogram for the inventory structure exceeding the quantity of the particular SKU detected on the inventory structure by more than a threshold difference (e.g., by 30%).

When notifying a store associate of this product quantity difference, the computer system can append a restocking list for inventory structures throughout the store with: a prompt to align the quantity of the SKU to the target count on the inventory structure; a location assigned to the SKU on the inventory structure; and/or a difference between the quantity of the SKU noted in the first list of product units detected on the inventory structure and the target count of the SKU assigned to the inventory structure by the planogram. The computer system can then serve this restocking list to a computing device associated with the store associate, such as in real-time, based on a stored priority of the particular SKU, or in preparation for a scheduled restocking period in the store.

14.2 Inventory Structure Orderliness

In another implementation, the computer system can: confirm that an inventory structure is sufficiently stocked with RFID-tagged products based on RFID data collected by the robotic system while scanning the inventory structure; characterize orderliness of the inventory structure based on positions and orientations of product units detected in an optical image of the inventory structure recorded substantially concurrently by the robotic system; and distribute prompts to correct the inventory structure if sufficiently disordered. For example, in Block S170, the computer system can generate a stock correction prompt for an inventory structure in response to a difference between locations and orientations of product units—in a set of product units detected in an image of the inventory structure—and locations and orientations of products defined in the planogram for the inventory structure. The system can also generate and distribute such prompts to order (or "tidy") an inventory structure—if the system determines that product units stored on this inventory structure are sufficiently disordered—separately (e.g., at a lower priority) than prompts for restocking the inventory structure when the system determines that the inventory structure is sufficiently under-stocked.

Alternatively, the computer system can interpret an orderliness of product units on the inventory structure from RFID data collected by the robotic system while navigating along the inventory structure during a scan cycle, such as a function of proximity of estimated RFID-based locations of product units of the same SKU on the inventory structure or based on how closely distribution of estimated RFID-based locations of product units on the inventory structure approximate a geometric arrangement (e.g., a 2D or 3D grid distribution of product units, a close-pack distribution of product units, etc.). The computer system can then selectively serve prompts to an associate of the store to adjust stock on the inventory structure if the computer system thus determines that stock on the inventory structure is disordered.

14.3 Digital Report/Virtual Representation of Inventory Structure

By comparing this list of SKUs and their actual quantities to the planogram (or textual or numerical representation of the planogram), the system can also populate the digital report with indicators of slots or other inventory structures that are empty, under-stocked, over-stocked, or improperly-stocked with the incorrect product, etc. For example, the system can generate a textual list of the stock state of each slot in the store, such as ordered with empty slots followed by under-stocked slots followed by improperly-stocked slots, etc. and ordered by highest-value SKU to lowest-value SKU. Alternatively, the system can generate a 2D heat map of the stock states of slots throughout the store, such as indicating regions in which highest-value slots are empty in red, lower-value empty slots and overstocked-slots in a cooler color, and properly-stocked slots in even cooler colors.

However, the system can generate a digital report of the stock state of the store in any other format and in any other way in Block S110.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for tracking stock level within a store comprises:
   at a robotic system, over a first period of time:
      navigating along a first inventory structure in the store;
      broadcasting radio frequency interrogation signals according to a first set of wireless scan parameters; and
      recording a first set of wireless identification signals returned by radio frequency identification tags coupled to product units arranged on the first inventory structure;
   generating a first list of product units arranged on the first inventory structure based on the first set of wireless identification signals;
   in response to the first list of product units comprising a particular product unit excluded from the first target stock list assigned to the first inventory structure and in response to the particular product unit assigned to a second inventory structure adjacent the first inventory structure, generating a second set of wireless scan parameters specifying a second interrogation power less than a first interrogation power specified in the first set of wireless scan parameters;
   at the robotic system, over the first period of time:
      navigating along the first inventory structure;
      broadcasting radio frequency interrogation signals according to the second set of wireless scan parameters; and
      recording a second set of wireless identification signals returned by radio frequency identification tags coupled to product units arranged on the first inventory structure;
   generating a second list of product units arranged on the first inventory structure based on the second set of wireless identification signals;
   assigning the second set of wireless scan parameters to the first inventory structure in response to the second list of product units excluding the particular product unit;
   detecting a first product quantity difference between the first second list of product units and a first target stock list assigned to the first inventory structure by a planogram of the store; and
   generating a stock correction prompt for the first inventory structure in response to the first product quantity difference.

2. The method of claim 1, further comprising:
   approximating locations of product units, in the second list of product units, arranged on the first inventory structure based on characteristics of corresponding wireless identification signals in the first set of wireless identification signals;
   detecting a first product location difference between locations of product units, in the second list of product units, and corresponding product locations assigned to the first inventory structure by the planogram; and
   generating a second stock correction prompt for the first inventory structure based on the first product location difference.

3. The method of claim 2, wherein approximating locations of product units, in the second list of product units arranged on the first inventory structure comprises:
   for a particular wireless identification signal received by the robotic system when occupying both a first position adjacent the first inventory structure and a second position adjacent the first inventory structure during the first period of time, triangulating a particular location of the particular product unit within a virtual coordinate system defined for the store based on the first position and the second position; and
   determining occupation of the particular product unit on the first inventory structure in response to the particular location of the particular product unit intersecting a known volume of the first inventory structure defined in the virtual coordinate system.

4. The method of claim 1:
   wherein generating the second list of product units arranged on the first inventory structure comprises generating the second list of product units comprising quantities of unique stock keeping units stored on the first inventory structure based on associations between stock keeping units and unique wireless identification signals stored in a name mapping system; and
   wherein detecting the first product quantity difference comprises detecting the first product quantity difference comprising one of:
      a quantity of a particular stock keeping unit noted in the second list of product units exceeding a target count of the particular stock keeping unit specified in the first target stock list; and
      the target count of the particular stock keeping unit specified in the first target stock list exceeding the quantity of the particular stock keeping unit by more than a threshold difference.

5. The method of claim 4:
   wherein generating the stock correction prompt for the first inventory structure comprises appending a restocking list for inventory structures throughout the store with:
      a prompt to align the quantity of the particular stock keeping unit to the target count;
      a location assigned to the particular stock keeping unit on the first inventory structure; and
      a difference between the quantity of the particular stock keeping unit noted in the second list of product units and the target count of the particular stock keeping unit; and
   further comprising serving the restocking list to a computing device associated with an associate of the store.

6. The method of claim 1, further comprising:
   at the robotic system, recording an optical image of the first inventory structure during the first period of time;
   retrieving, from a database of template images, a first set of template images, each template image in the first set of template images comprising visual features representing a product in the first target stock list assigned to the first inventory structure;
   detecting features in the optical image;
   identifying locations and orientations of a second set of product units on the first inventory structure based on correlations between visual features of template images in the first set of template images and features detected in the optical image; and
   generating a second stock correction prompt for the first inventory structure in response to a difference between locations and orientations of the second set of product units and locations and orientations of products defined in the planogram for the first inventory structure.

7. The method of claim 6, wherein retrieving the first set of template images comprises retrieving the first set of template images for a union of the second list of product units and the first target stock list assigned to the first inventory structure by the planogram.

8. The method of claim 6, further comprising appending the second list of product units generated from the first set of wireless identification signals with product units in the second set of product units, detected in the optical image, known to exclude radio frequency identification tags.

9. The method of claim 1, further comprising:
approximating locations of product units, in the second list of product units, arranged on the first inventory structure based on characteristics of corresponding wireless identification signals in the first set of wireless identification signals;
at the robotic system, recording an optical image of the first inventory structure during the first period of time;
in the optical image, identifying locations of and price values indicated by a set of price tags on the first inventory structure;
aligning locations of product units, in the second list of product units, to locations of price tags in the set of price tags;
for a particular product unit, in the second list of product units, detecting a price difference between a price assigned to the particular product unit and a price value indicated by an adjacent price tag in the set of price tags; and
in response to detecting the price difference, generating a third stock correction prompt to correct the adjacent price tag on the first inventory structure.

10. The method of claim 1, further comprising:
at the robotic system, recording an optical image of the first inventory structure during the first period of time;
retrieving, from a database of template images, a first set of template images, each template image in the first set of template images comprising visual features representing a product in the first target stock list assigned to the first inventory structure;
detecting features in the optical image;
identifying a second set of product units on the first inventory structure based on correlations between visual features of template images in the first set of template images and features detected in the optical image; and
in response to the second set of product units comprising a particular product unit excluded from the second list of product units, generating a second set of wireless scan parameters specifying a second interrogation power greater than a first interrogation power specified in the first set of wireless scan parameters;
at the robotic system, over a second period of time succeeding the first period of time:
navigating along the first inventory structure;
broadcasting radio frequency interrogation signals according to the second set of wireless scan parameters; and
recording a second set of wireless identification signals returned by radio frequency identification tags coupled to product units arranged on the first inventory structure;
generating a second list of product units arranged on the first inventory structure based on the second set of wireless identification signals; and
assigning the second set of wireless scan parameters to the first inventory structure in response to the second list of product units specifying the particular product unit.

11. A method for tracking stock level within a store comprises:
at a robotic system, over a first period of time:
navigating along a first inventory structure in the store;
broadcasting radio frequency interrogation signals according to a first set of wireless scan parameters; and
recording a first set of wireless identification signals returned by radio frequency identification tags coupled to product units arranged on the first inventory structure;
generating a first list of product units arranged on the first inventory structure based on the first set of wireless identification signals;
detecting a first product quantity difference between the first list of product units and a first target stock list assigned to the first inventory structure by a planogram of the store;
generating a stock correction prompt for the first inventory structure in response to the first product quantity difference;
identifying an identifier of the first inventory structure in the first set of wireless identification signals;
determining a location of the first inventory structure in the store based on a position of the robotic system at a time of receipt of the identifier of the first inventory structure; and
populating a catalog of infrastructure deployed in the store with the identifier of the first inventory structure and the location of the first inventory structure in the store.

12. The method of claim 1, further comprising:
identifying an identifier of the first inventory structure in the first set of wireless identification signals;
determining a location of the first inventory structure in the store based on a position of the robotic system at a time of receipt of the identifier of the first inventory structure; and
populating a catalog of infrastructure deployed in the store with the identifier of the first inventory structure and the location of the first inventory structure in the store.

13. The method of claim 1, further comprising:
approximating locations of product units, in the second list of product units, in a coordinate system defined within the store based on characteristics of corresponding wireless identification signals in the first set of wireless identification signals;
detecting a particular product unit, in the second list of product units, located below a threshold height and outside a known footprint of the first inventory structure;
at the robotic system:
navigating to an orientation that positions a location of the particular product unit within a field of view of an optical sensor in the robotic system; and
recording an optical image of the particular product unit through the optical sensor;
generating a spill correction prompt to remove the particular product unit from a floor of the store, the spill correction prompt comprising a form of the optical image; and
serving the spill correction prompt to a computing device associated with an associate of the store.

14. A method for tracking stock level within a store comprises:
at a robotic system, over a first period of time:
navigating along a first inventory structure in the store;
broadcasting radio frequency interrogation signals according to a first set of wireless scan parameters; and recording a first set of wireless identification signals returned by radio frequency identification tags coupled to product units arranged on the first inventory structure;

generating a first list of product units arranged on the first inventory structure based on the first set of wireless identification signals;

approximating locations of product units, in the first list of product units, arranged on the first inventory structure based on characteristics of corresponding wireless identification signals in the first set of wireless identification signals by:

for a particular wireless identification signal received by the robotic system when occupying both a first position adjacent the first inventory structure and a second position adjacent the first inventory structure during the first period of time, triangulating a particular location of the particular product unit within a virtual coordinate system defined for the store based on the first position and the second position; and determining occupation of the particular product unit on the first inventory structure in response to the particular location of the particular product unit intersecting a known volume of the first inventory structure defined in the virtual coordinate system;

detecting a first product quantity difference between the first list of product units and a first target stock list assigned to the first inventory structure by a planogram of the store;

generating a stock correction prompt for the first inventory structure in response to the first product quantity difference;

detecting a first product location difference between locations of product units, in the first list of product units, and corresponding product locations assigned to the first inventory structure by the planogram; and generating a second stock correction prompt for the first inventory structure based on the first product location difference.

15. A method for tracking stock level within a store comprises:

at a robotic system, over a first period of time:
navigating along a first inventory structure in the store;
broadcasting radio frequency interrogation signals according to a first set of wireless scan parameters;
recording a first set of wireless identification signals returned by radio frequency identification tags coupled to product units arranged on the first inventory structure; and
recording an optical image of the first inventory structure;

generating a first list of product units arranged on the first inventory structure based on the first set of wireless identification signals;

retrieving, from a database of template images, a first set of template images, each template image in the first set of template images comprising visual features representing a product in the first target stock list assigned to the first inventory structure;

detecting features in the optical image;

identifying locations and orientations of a second set of product units on the first inventory structure based on correlations between visual features of template images in the first set of template images and features detected in the optical image;

generating a second stock correction prompt for the first inventory structure in response to a difference between locations and orientations of the second set of product units and locations and orientations of products defined in the planogram for the first inventory structure;

appending the first list of product units generated from the first set of wireless identification signals with product units in the second set of product units, detected in the optical image, known to exclude radio frequency identification tags;

detecting a first product quantity difference between the first list of product units and a first target stock list assigned to the first inventory structure by a planogram of the store; and generating a stock correction prompt for the first inventory structure in response to the first product quantity difference.

16. A method for tracking stock level within a store comprises:

at a robotic system, over a first period of time:
navigating along a first inventory structure in the store;
broadcasting radio frequency interrogation signals according to a first set of wireless scan parameters;
recording a first set of wireless identification signals returned by radio frequency identification tags coupled to product units arranged on the first inventory structure; and
recording an optical image of the first inventory structure;

generating a first list of product units arranged on the first inventory structure based on the first set of wireless identification signals;

approximating locations of product units, in the first list of product units, arranged on the first inventory structure based on characteristics of corresponding wireless identification signals in the first set of wireless identification signals;

in the optical image, identifying locations of and price values indicated by a set of price tags on the first inventory structure;

aligning locations of product units, in the first list of product units, to locations of price tags in the set of price tags;

detecting a first product quantity difference between the first list of product units and a first target stock list assigned to the first inventory structure by a planogram of the store;

generating a first stock correction prompt for the first inventory structure in response to the first product quantity difference;

for a second product unit, in the first list of product units, detecting a price difference between a price assigned to the second product unit and a price value indicated by an adjacent price tag in the set of price tags; and in response to detecting the price difference, generating a second stock correction prompt to correct the adjacent price tag on the first inventory structure.

17. A method for tracking stock level within a store comprises:

at a robotic system, over a first period of time:
navigating along a first inventory structure in the store;
broadcasting radio frequency interrogation signals according to a first set of wireless scan parameters;
recording a first set of wireless identification signals returned by radio frequency identification tags coupled to product units arranged on the first inventory structure; and recording an optical image of the first inventory structure;
generating a first list of product units arranged on the first inventory structure based on the first set of wireless identification signals;
detecting a first product quantity difference between the first list of product units and a first target stock list assigned to the first inventory structure by a planogram of the store;
generating a stock correction prompt for the first inventory structure in response to the first product quantity difference;
retrieving, from a database of template images, a first set of template images, each template image in the first set of template images comprising visual features representing a product in the first target stock list assigned to the first inventory structure;
detecting features in the optical image;
identifying a second set of product units on the first inventory structure based on correlations between visual features of template images in the first set of template images and features detected in the optical image;
in response to the second set of product units comprising a particular product unit excluded from the first list of product units, generating a second set of wireless scan parameters specifying a second interrogation power greater than a first interrogation power specified in the first set of wireless scan parameters;
at the robotic system, over a second period of time succeeding the first period of time:
  navigating along the first inventory structure;
  broadcasting radio frequency interrogation signals according to the second set of wireless scan parameters; and
  recording a second set of wireless identification signals returned by radio frequency identification tags coupled to product units arranged on the first inventory structure;
generating a second list of product units arranged on the first inventory structure based on the second set of wireless identification signals; and
assigning the second set of wireless scan parameters to the first inventory structure in response to the second list of product units specifying the particular product unit.

18. The method of claim 11, further comprising:
in response to the first list of product units comprising a particular product unit excluded from the first target stock list assigned to the first inventory structure and in response to the particular product unit assigned to a second inventory structure adjacent the first inventory structure, generating a second set of wireless scan parameters specifying a second interrogation power less than a first interrogation power specified in the first set of wireless scan parameters;
at the robotic system, over the first period of time:
  navigating along the first inventory structure;
  broadcasting radio frequency interrogation signals according to the second set of wireless scan parameters; and
  recording a second set of wireless identification signals returned by radio frequency identification tags coupled to product units arranged on the first inventory structure;
generating a second list of product units arranged on the first inventory structure based on the second set of wireless identification signals; and
assigning the second set of wireless scan parameters to the first inventory structure in response to the second list of product units excluding the particular product unit.

19. A method for tracking stock level within a store comprises:
at a robotic system, over a first period of time:
  navigating along a first inventory structure in the store;
  broadcasting radio frequency interrogation signals according to a first set of wireless scan parameters; and
  recording a first set of wireless identification signals returned by radio frequency identification tags coupled to product units arranged on the first inventory structure;
generating a first list of product units arranged on the first inventory structure based on the first set of wireless identification signals;
approximating locations of product units, in the first list of product units, in a coordinate system defined within the store based on characteristics of corresponding wireless identification signals in the first set of wireless identification signals;
detecting a first product quantity difference between the first list of product units and a first target stock list assigned to the first inventory structure by a planogram of the store;
generating a stock correction prompt for the first inventory structure in response to the first product quantity difference;
detecting a second product unit, in the first list of product units, located below a threshold height and outside a known footprint of the first inventory structure;
at the robotic system:
  navigating to an orientation that positions a location of the second product unit within a field of view of an optical sensor in the robotic system; and
  recording an optical image of the second product unit through the optical sensor;
generating a spill correction prompt to remove the second product unit from a floor of the store, the spill correction prompt comprising a form of the optical image; and
serving the spill correction prompt to a computing device associated with an associate of the store.

* * * * *